(12) United States Patent
Wang et al.

(10) Patent No.: US 11,558,916 B2
(45) Date of Patent: Jan. 17, 2023

(54) METHOD AND APPARATUS FOR ESTABLISHING DUAL-CONNECTIVITY TO TRANSMIT DATA IN NEW RADIO COMMUNICATION ARCHITECTURE

(71) Applicant: SAMSUNG ELECTRONICS CO., LTD., Suwon-si (KR)

(72) Inventors: Hong Wang, Beijing (CN); Xiaowan Ke, Beijing (CN); Lixiang Xu, Beijing (CN); Qi Li, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/093,091

(22) Filed: Nov. 9, 2020

(65) Prior Publication Data

US 2021/0084705 A1 Mar. 18, 2021

Related U.S. Application Data

(63) Continuation of application No. 16/338,291, filed as application No. PCT/KR2017/010987 on Sep. 29, 2017, now Pat. No. 10,834,772.

(30) Foreign Application Priority Data

Sep. 30, 2016 (CN) .......................... 201610876699.7
Nov. 1, 2016 (CN) .......................... 201610942825.4
(Continued)

(51) Int. Cl.
*H04W 76/15* (2018.01)
*H04W 76/11* (2018.01)

(52) U.S. Cl.
CPC ............ *H04W 76/15* (2018.02); *H04W 76/11* (2018.02)

(58) Field of Classification Search
CPC .............................. H04W 76/11; H04W 76/15
See application file for complete search history.

(56) References Cited

U.S. PATENT DOCUMENTS 8,346,225 B2 1/2013 Raleigh
9,838,935 B2 12/2017 Wang et al.
(Continued)

FOREIGN PATENT DOCUMENTS

CN 103747442 A 4/2014
CN 105338572 A 2/2016
(Continued)

OTHER PUBLICATIONS

Communication dated Dec. 10, 2020, issued by The State Intellectual Property Office of P.R. China in Chinese Application No. 201710302320.6.
(Continued)

*Primary Examiner* — Kevin C. Harper
(74) *Attorney, Agent, or Firm* — Sughrue Mion, PLLC

(57) ABSTRACT

A method and an apparatus of establishing dual-connectivity to transmit data are disclosed. A PCell of the UE carries out a mapping function and realizes a PDCP layer, a RLC layer, a MAC layer and a physical layer, and a SCell of the UE carries out quality packet data to data radio bearer mapping and realizes a PDCP layer, a MAC layer and a physical layer, in which a core network transmits data of the UE to the PCell, the PCell maps a QoS Flow of the data of the UE which is quality packet data to a data radio bearer on a mapping layer, performs path split, transmits data of respective paths to the UE through the PCell and SCell of the UE, and the UE regroups the data of the respective paths on the PDCP layer, and transmits the regrouped data to an application layer.

16 Claims, 16 Drawing Sheets

(30) Foreign Application Priority Data

Dec. 14, 2016 (CN) .......................... 201611154531.1
Apr. 27, 2017 (CN) .......................... 201710288179.9
May 2, 2017 (CN) .......................... 201710302320.6

(56) References Cited

U.S. PATENT DOCUMENTS

| | | | |
|---|---|---|---|
| 2010/0195503 | A1 | 8/2010 | Raleigh |
| 2014/0241317 | A1 | 8/2014 | Jamadagni et al. |
| 2014/0269575 | A1 | 9/2014 | Zhang et al. |
| 2015/0043492 | A1* | 2/2015 | Baek ................. H04W 56/0005 370/329 |
| 2015/0094073 | A1 | 4/2015 | Peng |
| 2015/0215840 | A1 | 7/2015 | Yiu et al. |
| 2015/0327107 | A1 | 11/2015 | Kim et al. |
| 2016/0174281 | A1 | 6/2016 | Wen et al. |
| 2016/0212753 | A1 | 7/2016 | Wu |
| 2016/0338130 | A1 | 11/2016 | Park et al. |
| 2019/0059030 | A1 | 2/2019 | Xu et al. |
| 2019/0141585 | A1 | 5/2019 | Dai et al. |
| 2020/0053814 | A1 | 2/2020 | Minokuchi et al. |

FOREIGN PATENT DOCUMENTS

| | | | |
|---|---|---|---|
| CN | 105657861 | A | 6/2016 |
| CN | 106559920 | A | 4/2017 |
| WO | 2013/017851 | A1 | 2/2013 |
| WO | 2015030483 | A1 | 3/2015 |
| WO | WO-2015065062 | A1 * | 5/2015 ........ H04W 36/0055 |
| WO | 2016/117979 | A1 | 7/2016 |
| WO | 2016/138937 | A1 | 9/2016 |

OTHER PUBLICATIONS

Huawei, "Context fetch in light connection", 3GPP TSG-RAN3 Meeting #93, R3-161721, Aug. 22-26, 2016, Gothenburg, Sweden, pp. 1-3 (3 pages total).
Huawei, "Principles of Light Connection", 3GPP TSG-RAN3 Meeting #93, R3-161718, Aug. 22-26, 2016, pp. 1-3 (3 pages total).
Communication dated Oct. 27, 2021 by the Korean Intellectual Property Office in Korean Patent Application No. 10-2019-7009273.
"3rd Generation Partnership Project; Technical Specification Group Radio Access Network; Study on Small Cell enhancements for EUTRA and E-UTRAN; Higher layer aspects (Release 12)", 3GPP Standard; 3GPP TR 36.842, 3rd Generation Partnership Project (3GPP), Mobile Competence Centre ; 650, Route Des Lucioles ; F-06921 Sophiaantipolis Cedex ; France, vol. RAN WG2, No. V12.0.0, Jan. 7, 2014, pp. 1-71, XP050729403.
International Search Report and Written Opinion dated Jan. 18, 2018 issued by the International Searching Authority in counterpart International Application No. PCT/KR2017/010987 (PCT/ISA/220, PCT/ISA/210, and PCT/ISA/237).
"3rd Generation Partnership Project; Technical Specification Group Radio Access Network; Evolved Universal Terrestrial Radio Access Network (E-UTRAN); X2 application protocol (X2AP) (Release 13)", 3GPP Standard; 3GPP TS 36.423, 3rd Generation Partnership Project (3GPP), Mobile Competence Centre ; 650, Route Des Lucioles ; F-06921 Sophiaantipolis Cedex ; France, vol. RAN WG3, No. V13.5.0, Sep. 28, 2016, pp. 1-238, XP051172600.
"3 Generation Partnership Project; Technical Specification Group Radio Access Network; Evolved Universal Terrestrial Radio Access Network (E-UTRAN); S1 Application Protocol (S1AP) (Release 13)", 3GPP Standard; 3GPP TS 36.413, 3rd Generation Partnership Project (3GPP), Mobile Competence Centre ; 650, Route Des Lucioles ; F-06921 Sophiaantipolis Cedex ; France, vol. RAN WG3, No. VI3.4.0, Sep. 28, 2016, pp. 1-333, XP051172599.
Communication dated May 13, 2020, issued by the Intellectual Property Office of P.R. China in counterpart Chinese Application No. 201710288179.9.
Communication dated Nov. 25, 2019 by the European Patent Office in counterpart European Patent Application No. 17856835.8.
Notice of Allowance issued in parent U.S. Appl. No. 16/338,291 dated Sep. 14, 2020.
Communication dated Apr. 13, 2021 issued by the Korean Intellectual Property Office in Korean Application No. 10-2019-7009273.
ETSI TS 36.423 v12.3.0, LTE, Evolved Universal Terrestrial Radio Access Network (E-UTRAN), X2 Application Protocol (X2AP), Sep. 30, 2014, 153 pages.
"3rd Generation Partnership Project; Technical Specification Group Radio Access Network; Study on Small Cell enhancements for EUTRA and E-UTRAN; Higher layer aspects (Release 12)", 3GPP Standard; 3GPP TR 36.842, 3rd Generation Partnership Project (3GPP), Mobile Competence Centre ; 650, Route Des Lucioles ; F-06921 Sophiaantipolis Cedex ; France, vol. RAN WG2, No. V04.2, Nov. 30, 2013, pp. 1-69.
"RAN initiated paging optimization in light connection", 3GPP TSG RAN WG2 Meeting #93bis, 8.9.1, R2-162277, Apr. 2016, 4 pages total.
"Discussion on paging for a lightly connected UE", 3GPP TSG-RAN WG3 Meeting #93, 21, R3-161930, Aug. 2016, 2 pages total.
"Discussion on NR SeNB configuration", 3GPP TSG-RAN WG2 Meeting #95, 9.4.3.3, R2-165013, Aug. 2016, 2 pages total.
Communication dated Nov. 22, 2021 issued by the State Intellectual Property Office of P.R. China in Chinese Application No. 201710302320.6.
Communication dated Jun. 10, 2022 issued by the China National Intellectual Property Administration in Chinese Application No. 202110148525.X.
Communication dated Oct. 14, 2022 by the European Patent Office in European Patent Application No. 21179847.5.

* cited by examiner

Xn InterffaceData Format 1

| Format type indication |
| --- |
| QoS flow identity |
| Xn serial number |

FIG.9A

Xn InterffaceData Format 2

| Format type indication |
| --- |
| Xn serial number of QoS flow 1 |
| Xn serial number of QoS flow 2 |
| . . . |
| Xn serial number of QoS flow n |

FIG.9B

Xn InterffaceData Format 3

| Format type indication |
| --- |
| QoS flow identity |
| Data cache information |
| Xn data loss information |

FIG.9C

Xn InterffaceData Format 4

| Format type indication |
| --- |
| Data cache information of the first QoS flow |
| Data cache information of the second QoS flow |
| . . . . . |
| Data cache information of the $n^{th}$ QoS flow |
| Xn data loss information |

FIG.9D

METHOD AND APPARATUS FOR ESTABLISHING DUAL-CONNECTIVITY TO TRANSMIT DATA IN NEW RADIO COMMUNICATION ARCHITECTURE

CROSS-REFERENCE TO RELATED APPLICATION(S)

This application is a continuation of U.S. application Ser. No. 16/338,291, filed Mar. 29, 2019, which is a National Phase Entry of PCT International Application No. PCT/KR2017/010987, which was filed on Sep. 29, 2017 and claims priority to Chinese Patent Application No. 201610876699.7 filed on Sep. 30, 2016, No. 201610942825.4 filed on Nov. 1, 2016, Chinese Patent Application No. 201611154531.1 filed on Dec. 14, 2016, Chinese Patent Application No. 201710288179.9 filed on Apr. 27, 2017, and Chinese Patent Application No. 201710302320.6 filed on May 2, 2017 the entire disclosure of each of these applications is incorporated herein by reference.

TECHNICAL FIELD

The present disclosure relates to radio communications, and in particular to a method and apparatus for establishing dual-connectivity for a UE, and transmitting data to the UE through two or more base stations, in the case of base stations of a new radio communication system.

BACKGROUND ART

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In addition, it is predictable that in the future, there will be more and more intelligent electronic devices and connected articles for daily use, i.e., they are all capable of accessing a network. From a first aspect, some of father UEs may have features of being static or low-mobility, low cost, sending and receiving data intermittently with the amount of data being very small. For those UEs, signaling overheads for setting up and releasing connections are far more than the amount of data transmitted and received. From a second aspect, the access delay of further mobile communication networks are greatly reduced to support more and more real-time applications, e.g., virtual reality, or the like. There are many issues to be addressed in current networks regarding aspects of reducing signaling overheads, improving data transmission efficiency and reducing the access delay of UEs to a network.

DISCLOSURE OF INVENTION

Technical Problem

The present disclosure provides a method and an apparatus for establishing dual-connectivity to transmit data under the new radio technology.

The present disclosure provides a method and an apparatus for connections on two or more base stations may be established for a UE so as to improve the throughput of the system and improve the reliability of data receiving and increase transmission rate.

Solution to Problem

According to an example embodiment of the present disclosure, a method for establishing dual-connectivity to transmit data, including:

sending, by a base station where a primary cell (PCell) of a user equipment (UE) is located, a secondary base station adding request message to a base station where a secondary cell (SCell) is located, in which the secondary base station adding request message includes configuration information of a quality of service flow (QoS Flow) which is quality packet data to be created, and the configuration information includes an identity of the QoS Flow;

receiving, by the base station where the PCell of the UE is located, a secondary base station adding response message from the base station where the SCell is located, in which the secondary base station adding response message includes configuration information of a user plane configured for the SCell, and the configuration information of the user plane includes: the identity of the QoS Flow and an identity of a user plane tunnel; and sending, by the base station where the PCell of the UE is located, a bearer modification message to a core network, in which the bearer modification message includes configuration information of the user plane on the SCell, an IP address of the user plane and the identity of the user plane tunnel.

According to an example embodiment of the present disclosure, a method for establishing dual-connectivity to transmit data, including:

sending, by a base station where a primary cell (PCell) is located, a secondary base station adding request message to a base station where a secondary cell (SCell) is located, in which the secondary base station adding request message includes configuration information of a split bearer to be established, and the configuration information of the split bearer includes an identity of a data radio bearer (DRB) or an identity of an Xn user plane and quality information of the DRB; and receiving, by the base station where the PCell is located, a secondary base station adding response message from the base station where the SCell is located, in which the secondary base station adding response message includes configuration information of a user plane configured for the SCell, and the configuration information of the user plane includes: the identity of the DRB or the identity of the Xn user plane and an identity of a user plane tunnel.

According to an example embodiment of the present disclosure, a data transmission system under a new radio network, including: at least two base stations and a user equipment (UE), in which:

a primary cell (PCell) of the UE carries out a mapping function and realizes a packet data convergence protocol (PDCP) layer, a radio link control (RLC) layer, a media access control (MAC) layer and a physical layer, and a secondary cell (SCell) of the UE carries out quality packet data to data radio bearer mapping and realizes a PDCP layer, a MAC layer and a physical layer, in which a core network transmits data of the UE to the PCell, the PCell maps a QoS Flow of the data of the UE which is quality packet data to a data radio bearer on a mapping layer, performs path split, transmits data of respective paths to the UE through the PCell and SCell of the UE, and the UE regroups the data of the respective paths on the PDCP layer, and transmits the regrouped data to an application layer; or the core network transmits the data of the UE to the PCell and the Scell, the PCell and the Scell map QoS Flows of the data of the UE which are quality packet data to data radio bearers on mapping layers, and the data is transmitted to the UE through the PCell and SCell of the UE, and the UE regroups the data on an application layer of the UE.

According to an example embodiment of the present disclosure, a data transmission method under a new radio network, including:

receiving, by a base station where a secondary cell (SCell) is located, a downlink data packet from a base station where a primary cell is located, in which the downlink data packet comprises: information of quality packet data which is a quality of service flow (QoS Flow); and sending, by the base station where the SCell is located, an uplink data packet to the base station where the primary cell is located, in which the uplink data packet comprises the information of the QoS Flow and cache information of the QoS Flow.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF DRAWINGS

Various example embodiments of the present disclosure and the foregoing and other aspects, features, and advantages will be apparent from the following detailed description, taken in conjunction with the accompanying drawings, in which like reference numerals refer to like elements, and wherein:

FIGS. 9A, 9B, 9C, and 9D are schematic diagrams of Embodiment 5 of the present disclosure;

MODE FOR THE INVENTION

Figure 1:
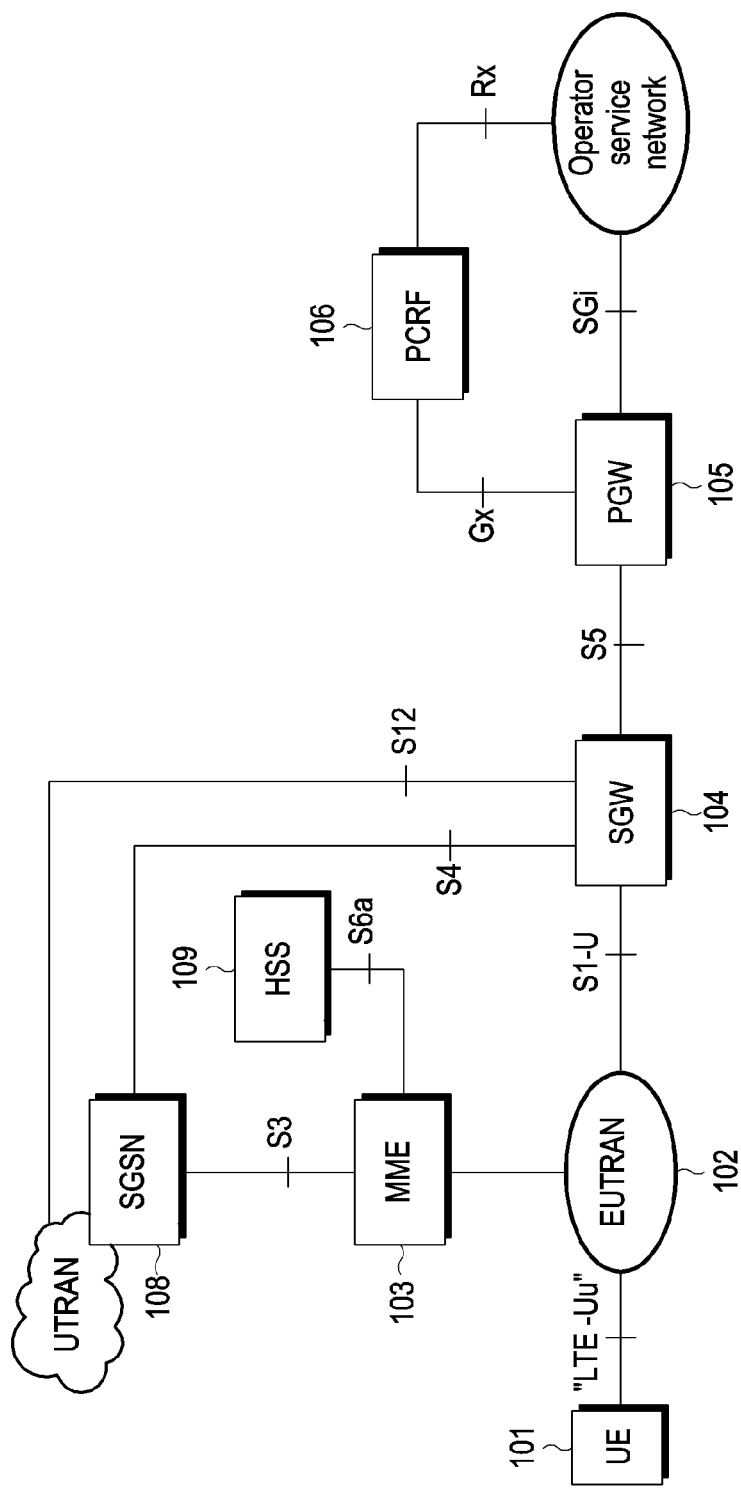
FIG. 1 is a schematic diagram illustrating a system structure of an SAE system in accordance with the present disclosure.

Hereinafter, example embodiments of the present disclosure are described in greater detail with reference to the accompanying drawings.

In describing the example embodiments, the description of technologies that are known in the art and that are not directly related to the present disclosure may be omitted for the sake of clarity.

For the same reasons, some elements may be exaggerated or schematically illustrated. The size of each element does not necessarily reflect the real size of the element. The same reference numeral is used to refer to the same element throughout the drawings.

Advantages and features of the present disclosure, and methods for achieving the same may be understood through the various example embodiments to be described below with reference to the accompanying drawings. However, the present disclosure is not limited to the example embodiments disclosed herein, and various changes may be made thereto. The example embodiments disclosed herein are provided only to inform one of ordinary skilled in the art of the category of the present disclosure. The present disclosure is defined by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a dedicated processor, a special-use computer or other programmable data processing devices, the instructions executed through a processor of a computer or other programmable data processing devices cause the devices and/or processors to perform the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instructions for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" may refer, for example, to a software element or a hardware element such as processing circuitry, a field-programmable gate array (FPGA) or an application specific integrated circuit (ASIC), or the like, but is not limited thereto. A unit plays a certain role. However, the term "unit" is not limited as meaning a software and/or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be separated into sub elements or sub units. Further, an element or a 'unit' may be implemented to reproduce one or more CPUs in a device or a security multimedia card.

Although the description of example embodiments herein mentions particular communication protocols, systems, and services, the subject matter of the present disclosure may also be applicable to other communication schemes or services having similar technical backgrounds without departing from the scope of the present disclosure, and this may be determined by one of ordinary skill in the art.

The present disclosure may use the following technical schemes:

A method for establishing dual-connectivity to transmit data, including:

sending, by a base station where a primary cell (PCell) of a user equipment (UE) is located, a secondary base station adding request message to a base station where a secondary cell (SCell) is located, in which the secondary base station adding request message includes configuration information of a quality of service flow (QoS Flow) which is quality packet data to be created, and the configuration information includes an identity of the QoS Flow;

receiving, by the base station where the PCell of the UE is located, a secondary base station adding response message from the base station where the SCell is located, in which the secondary base station adding response message includes configuration information of a user plane configured for the SCell, and the configuration information of the user plane includes: the identity of the QoS Flow and an identity of a user plane tunnel; and sending, by the base station where the PCell of the UE is located, a bearer modification message to a core network, in which the bearer modification message includes configuration information of the user plane on the SCell, an IP address of the user plane and the identity of the user plane tunnel.

Preferably, the secondary base station adding request message sent from the base station where the PCell of the UE is located to the base station where the SCell is located carries: an identity of a tunnel for data forwarding (TEID) allocated by the base station where the PCell is located.

Preferably, the secondary base station adding request message sent from the base station where the PCell of the UE is located to the base station where the SCell is located carries: an identity of a QoS Flow, data of which is suggested to be forwarded.

Preferably, the secondary base station adding response message received by the base station where the PCell of the UE is located from the base station where the SCell is located carries an identity of a QoS Flow, data of which needs to be forwarded, and information indicating forwarding is required.

Preferably, a tunnel decided by the secondary base station includes a tunnel between a master base station and a secondary base station and/or a tunnel between the secondary base station and the core network, in which the tunnel decided by the secondary base station is targeted for one PDU Session.

A method for establishing dual-connectivity to transmit data, including:

sending, by a base station where a primary cell (PCell) is located, a secondary base station adding request message to a base station where a secondary cell (SCell) is located, in which the secondary base station adding request message includes configuration information of a split bearer to be established, and the configuration information of the split bearer includes an identity of a data radio bearer (DRB) or an identity of an Xn user plane and quality information of the DRB; and receiving, by the base station where the PCell is located, a secondary base station adding response message from the base station where the SCell is located, in which the secondary base station adding response message includes configuration information of a user plane configured for the SCell, and the configuration information of the user plane includes: the identity of the DRB or the identity of the Xn user plane and an identity of a user plane tunnel.

A data transmission system under a 5G network, including: at least two base stations and a user equipment (UE), in which:

a primary cell (PCell) of the UE carries out a mapping function and realizes a packet data convergence protocol (PDCP) layer, a radio link control (RLC) layer, a media access control (MAC) layer and a physical layer, and a secondary cell (SCell) of the UE carries out quality packet data to data radio bearer mapping and realizes a PDCP layer, a MAC layer and a physical layer, in which a core network transmits data of the UE to the PCell, the PCell maps a QoS Flow of the data of the UE which is quality packet data to a data radio bearer on a mapping layer, performs path split, transmits data of respective paths to the UE through the PCell and SCell of the UE, and the UE regroups the data of the respective paths on the PDCP layer, and transmits the regrouped data to an application layer; or the core network transmits the data of the UE to the PCell and the Scell, the PCell and the Scell map QoS Flows of the data of the UE which are quality packet data to data radio bearers on mapping layers, and the data is transmitted to the UE through the PCell and SCell of the UE, and the UE regroups the data on an application layer of the UE.

A data transmission method under a 5G network, including:

receiving, by a base station where a secondary cell (SCell) is located, a downlink data packet from a base station where a primary cell is located, in which the downlink data packet comprises: information of quality packet data which is a quality of service flow (QoS Flow); and sending, by the base station where the SCell is located, an uplink data packet to the base station where the primary cell is located, in which the uplink data packet comprises the information of the QoS Flow and cache information of the QoS Flow.

Preferably, the information of the QoS Flow in the downlink data packet includes: an identity of the QoS Flow or information indirectly indicating an identity of the QoS Flow by a location of a header of the downlink data packet.

Preferably, the information of the QoS Flow in the uplink packet includes: an identity of the QoS Flow or information indirectly indicating an identity of the QoS Flow by a location of a header of the uplink data packet.

The present disclosure further provides a method and apparatus for connection control of light-connection UEs to control the connection of a UE after the UE moves out of a light-connection paging area.

The method of connection control of a light-connection UE according to the present disclosure includes:

judging, by a first radio access network (RAN) node, whether a pre-set condition is met;

determining, by a first RAN, a mobility control operation associated with a light-connection UE in response to a determination that the pre-set condition is met.

Preferably, the pre-set condition includes at least one of: preferably, there is no data transmission demand, there is only one data transmission demand, there is no uplink UE data transmission demand, there is no downlink UE data transmission demand, there is no control plane data transmission demand, there is no user plane data transmission demand, the UE moves out of a configured paging area, the UE changes a paging area, the UE does not move out of a configured paging area, or obtaining an access request of UE; and/or the mobility control operation associated with the light-connection UE includes at least one of: releasing the UE, suspending the UE, updating the light-connection paging area of the UE, deleting the light connection of the UE, keeping the RAN node of the light connection of the UE unchanged, or demanding the UE to be in a light-connection mode.

Preferably, judging by the first RAN node whether the pre-set condition is met includes: judging by the first RAN node whether the pre-set condition is met based on access information about the light-connection UE obtained by the first RAN node.

Preferably, the access information about the light-connection UE includes at least one of: information on whether there is data transmission demand, information on whether there is data forwarding demand, information on whether the UE has moved out of the paging area, information on whether the UE has moved out of the paging area and has no data transmission demand, information on whether there is the demand of changing the paging area, or information on whether there is only one data transmission demand.

Preferably, the first RAN node may obtain the access information about the light-connection UE from one of: the UE, a second RAN node, the core network, a core network user plane node, or a core network control plane node.

Preferably, releasing the UE includes at least one of: releasing UE context, releasing a connection between the UE and a RAN node, releasing a connection for the UE between the RAN node and a core network node, or requiring the UE to return to an idle mode; and/or suspending the UE includes at least one of: suspending UE context, suspending a connection between the UE and a RAN node, suspending a connection for the UE between the RAN node and a core network node, or requesting the UE to return to an idle mode; and/or updating the light-connection paging area of the UE includes at least one of: configuring a light-connection paging area, indicating the light-connection RAN node of the UE is unchanged, or requiring the UE to be in a light-connection mode.

Preferably, determining by the first RAN the mobility control operation associated with the light-connection UE includes:

transmitting, by the first RAN, the mobility control operation associated with the light-connection UE to a core network node, the UE, or a second RAN node.

The present disclosure provides a network device, including a sending module, a receiving module, and a controlling module, the controlling module is configured to judge whether a pre-set condition is met, and determine a mobility control operation associated with a light-connection UE in response to a determination that the pre-set condition is met; and the sending module is configured to send the mobility control operation associated with the light-connection UE under the control of the controlling module.

The present disclosure provides a method for connection control of light-connection UEs, including:

judging, by a second radio access network (RAN) node, whether a pre-set condition is met; and determining, by a second RAN node, a connection control operation associated with a light-connection UE based on the pre-set condition which is met.

Preferably, the pre-set condition includes at least one of: the second RAN node obtains a mobility control operation associated with the light-connection UE, there is no interface between the second RAN node and an RAN interface of the light-connection UE; and/or the mobility control operation associated with the light-connection UE includes at least one of: releasing the UE, suspending the UE, updating the light-connection paging area of the UE, deleting the light connection of the UE, keeping the RAN node of the light connection of the UE unchanged, or demanding the UE to be in a light-connection mode.

Preferably, the procedure of determining by the second RAN node the connection control operation associated with a light-connection UE based on the pre-set condition which is met includes:

when the pre-set condition met is receiving the mobility control operation associated with the light-connection UE, determining by the second RAN node the connection control operation associated with the light-connection UE includes at least one of: performing an operation according to the mobility control operation associated with the light-connection UE, or sending the light-connection mobility control operation received; and/or when the pre-set condition met is there is no interface between the second RAN node and the RAN interface of the light-connection UE, the connection control operation associated with the light-connection UE includes at least one of: indicating that there is no interface between the RAN node accessed by the UE and the RAN node of the light connection of the UE, requesting to trigger a location update procedure at the core network level, rejecting a connection establish request of the UE, rejecting a connection resume request of the UE, sending messages about the UE exchanged between RAN nodes to other RAN nodes via the core network, or the second RAN node requesting the core network to establish UE context in a second RAN.

Preferably, determining by the second RAN the connection control operation associated with the light-connection UE includes:

sending, by the second RAN, the connection control operation associated with the light-connection UE to a core network node, the UE or the first RAN node, a RAN node after determining the connection control operation associated with the light-connection UE.

The present disclosure provides a network device, including a sending module, a receiving module, and a controlling module, the controlling module is configured to judge whether a pre-set condition is met, and determine a connection control operation associated with a light-connection UE in response to a determination that the pre-set condition is met; and the sending module is configured to send the connection control operation associated with the light-connection UE under the control of the controlling module.

The present disclosure provides a method for connection control of light-connection UEs, including:

obtaining, by a UE, a connection control operation and/or a mobility control operation associated with a light-connection UE; and performing, by the UE, the connection control operation and/or the mobility control operation.

Preferably, the mobility control operation associated with the light-connection UE includes at least one of: releasing the UE, suspending the UE, updating the light-connection paging area of the UE, deleting the light connection of the UE, keeping the RAN node of the light connection of the UE unchanged, or demanding the UE to be in a light-connection mode; and/or the connection control operation associated with the light-connection UE includes at least one of: indicating that there is no interface between the RAN node accessed by the UE and the RAN node of the light connection of the UE, requesting to trigger a location update procedure at the core network level, rejecting a connection establish request of the UE, rejecting a connection resume request of the UE.

Preferably, when the connection control operation associated with the light-connection UE includes at least one of: indicating that there is no interface between the RAN node accessed by the UE and the RAN node of the light connection of the UE, requesting to trigger a location update procedure at the core network level, rejecting a connection resume request of the UE; the UE performs at least one of: initiating a location update procedure at the core network level, initiating a service requesting procedure at the core network level, or initiating a connection setup request procedure at a RAN node.

Preferably, the procedure of obtaining by a UE a connection control operation and/or a mobility control operation associated with a light-connection UE includes:

obtaining, by the UE, the mobility control operation associated with the light-connection UE from a RAN or a core network; and/or obtaining, by the UE, the connection control operation associated with the light-connection UE from a RAN or a core network.

The present disclosure provides a network device, including a sending module, a receiving module, and a controlling module, the receiving module is configured to receive from a network device an indication of reception of a connection control operation and/or a mobility control operation associated with a light-connection UE; and the controlling module is configured to perform the connection control operation according to the information.

According to the above technical mechanisms, after a UE moves out of a light-connection paging area, connection of the UE can be controlled by cooperation of three parties, i.e., a RAN node providing a light-connection to the UE, a RAN node accessed by the UE, so as to implement connection control of a moving UE which has no data transmission demand and connection control where there is no interface between a RAN node accessed by a UE and a RAN node having a light connection with the UE. The technical mechanisms make full use of the advantages of light connection in saving signaling overhead while avoiding impacts of light-connections on implementations of existing functions and services.

Contemporary mobile communications technology are tending to provide users with high-data rate multimedia services.

FIG. 1 is a schematic diagram illustrating a system structure of a system architecture evolution (SAE) system.

In the system, user equipment (UE) 101 is a terminal device supporting a network protocol. Evolved universal terrestrial radio access network (E-UTRAN) 102 is a wireless access network which includes macro base stations (eNodeBs/NodeB) which provide UEs with interfaces for accessing the wireless network. Mobility management entity (MME) 103 manages mobility context, session context and security information of UEs. Serving gateway (SGW) 104 provides user plane functions. MME 103 and SGW 104 may reside in the same physical entity. Packet data network (PDN) gateway (PGW) 105 implements functions including accounting, lawful interception and so on, and may reside in the same physical entity with SGW 104. Policy and charging rule functions (PCRF) 106 provides Quality of Service (QoS) policies and charging rules. Serving GPRS support node (SGSN) 108 is a network node device providing routing for data transmission in the Universal Mobile Telecommunications System (UMTS). Home Subscriber Server (HSS) 109 is a home subscribed subsystem of the UE, and maintains user information including a current location of the UE, the address of the serving node, user security information, packet data context of the UE, and so on.

New radio, in other words, 5G refers to the fifth generation of mobile communication technology. Unlike the previous four generations, 5G is not a single radio technology, but fusion of existing radio communication technologies. At present, a long time evolution (LTE) peak rate may reach 100 Mbps, and a 5G peak rate will reach 10 Gbps, 100 times higher than that of 4G. A traditional 4G network has a limited ability to process spontaneous situations, and cannot support some services such as high-definition video, high-quality voice, augmented reality, and virtual reality. 5G will introduce more advanced technologies, through higher spectral efficiency, more spectrum resources, and more dense cells to meet the demands of mobile service traffic growth and address the problems faced by 4G networks, so as to build a high transmission rate, high capacity, low delay, high reliability, and excellent user experience network. As shown in FIG. 1, the 5G architecture includes a 5G access network and a 5G core network. A UE communicates with a data network through the access network and the core network.

In the evolution of the network, the first phase will continue to use LTE base stations, while supporting 5G UEs and using 5G features. So the LTE base stations are upgraded to support the 5G features, which is attractive to operators and is what the operators want. If a LTE base station is upgraded, the LTE base station can be connected to a 5G core network. In the present disclosure, a LTE base station that can be connected to a 5G core network is called an eLTE eNB.

Figure 2:
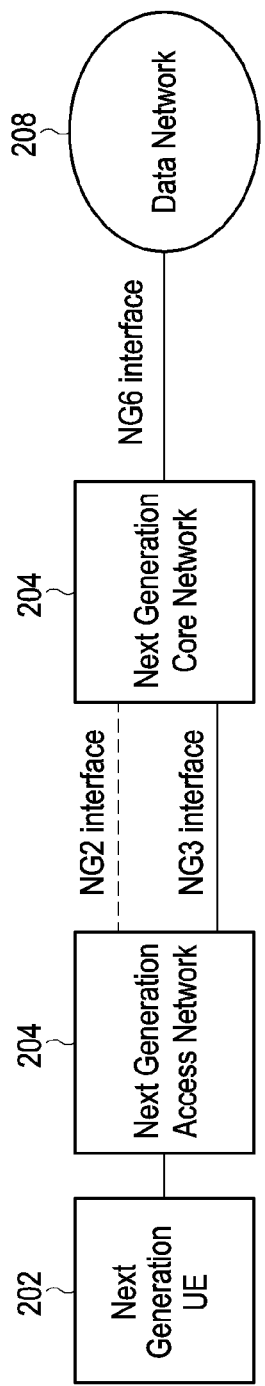
FIG. 2 is a schematic diagram illustrating an initial system structure of the next generation (5G) network in accordance with the present disclosure.

FIG. 2 is a schematic diagram illustrating an initial system structure of the next generation (in other words, 5G or new radio) network.

Referring to FIG. 2, the network includes next-generation (NextGen) UE 202, NextGen access network or NextGen wireless access network (NextGen (R)AN) 204, NextGen core network (NextGen Core) 206 and a data network 208. The control plane interface between the NextGen (R)AN 204 and the NextGen Core 206 is NG2 (may also referred to as NG-C), and the user plane interface is NG3 (may also referred to as NG-C). The names of the interfaces are just temporary names which may be replaced in future decisions of 3GPP, and the change in the names does not affect the technical mechanism of the present disclosure. The NextGen Core 206 may also include a user-plane functional entity and a control-plane functional entity.

Figure 3:
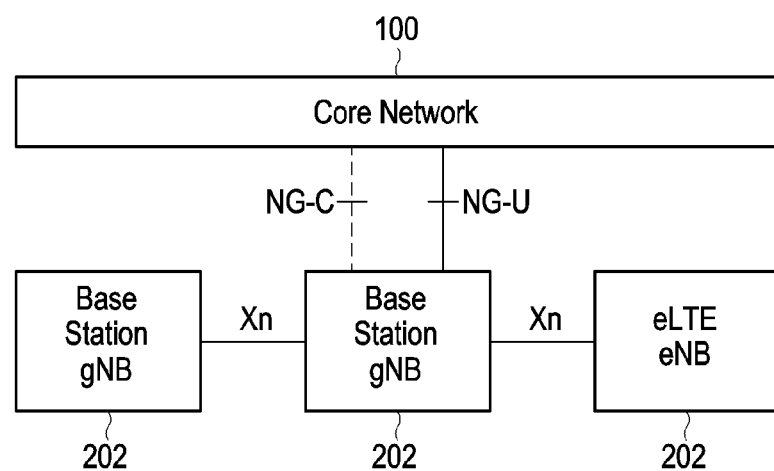
FIG. 3 is a diagram of a 5G system architecture.

FIG. 3 is a schematic diagram of a 5G (or new radio) architecture. Node 100 is a 5G core network.

Referring to FIG. 3, the 5G core network includes a control plane node and a user plane node, and they may be different entities. NG interfaces are between the 5G core network and 5G base stations, and the NG interfaces include control planes and user planes. The control plane is an interface between the control plane node of the 5G core network and a base station. The user plane is an interface between the user plane node of the 5G core network and the base station. The base station connected to the 5G core network may be a 5G base station, gNB, or an enhanced LTE base station, referred to as an eLTE eNB. The interface between gNBs is an Xn interface, and the Xn interface includes a user plane interface and a control plane interface. The interface between a gNB and an eLTE base station is also an Xn interface.

A UE can simultaneously transmit and receive data at two base stations, which is called dual-connectivity. In the two base stations, only one base station is responsible for transmitting radio resource control (RRC) messages to the UE and is responsible for interacting with the core network control plane entity, and the base station is called master base station, MeNB. The other base station is called secondary base station, SeNB. There is a cell for the UE in the master base station which is a primary cell of the UE, Pcell, and through the primary cell, RRC messages are sent to the UE. The other cells are secondary cells, Scells. There is a cell in the Scells ???? of the secondary base station which is a primary cell of the secondary base station, pScell ???? (functions as a pScell). The PScell ???? has an uplink physical layer control channel, other Scells don't. A cell group of the master base station is a master cell group (MCG), and a cell group of the secondary base station is a secondary cell group (SCG). It is also possible to extend dual-connectivity to multi-connectivity where there is a master base station and multiple secondary base stations. These base stations transmit data to the UE, which can improve the throughput of the system and the rate of the UE. When the data radio bearer signal quality of a certain base station is poor, data may be transmitted on other base stations which have a good data radio bearer signal quality.

The configuration of a secondary cell group for the UE is performed by a secondary base station, and the configuration for the UE by the secondary base station is performed by an RRC container and is transmitted to the UE by the master base station. The master base station does not resolve the RRC container, or resolves it but does not change the configuration inside the RRC container. There are two types of bearers based on SeNB. One type is called split bearer, and the other type is called SCG bearer. A protocol stack of a convergence protocol of the split bearer, packet data convergence protocol (PDCP), is on the master base station, and other user plane protocol layers (such as radio link control (RLC)/media access control (MAC)/physical layer) are on the secondary base stations. The SCG bearer means that all user plane protocol stacks are on the secondary base stations, including PDCPRLC/MAC/physical layer, and a secondary base station receives data from the core network, and processes data through the user plane, sends data to the UE through an air interface.

In the 5G technology, some technologies different from those of the 4G technology are used, for example, 5G defines a new model for the QoS architecture. When a data connection (protocol data unit (PDU) session) is created, the core network sends a default QoS policy or/and an authenticated QoS policy to a radio access network (RAN) and the UE. The data connection is a transmission path between the UE and the core network, and it includes a transmission path between the core network and a base station and a data radio bearer between the base station and the UE. The PDU session is a connection between the UE and a packet data network, and this connection is used to transmit data units. Generally, one PDU session is created for one service. The types of data units include IP data, Ethernet data and non-IP data. When establishing the PDU session, the core network sends a QoS policy to the RAN through a NG interface, and sends the QoS policy to the UE through a non-access stratum (NAS) interface. The QoS policy contains QoS Flow indication/description information, and contains specific QoS information. Specific QoS information includes at least one of the following: A. data delay target, B. data error rate, C. data priority, D. guaranteed data rate, E. maximum data rate and other information, such as application layer information.

The RAN establishes a default data radio bearer (DRB) according to QoS requirements, and the RAN may establish other DRBs in addition to the default DRB. In the user plane, the core network forms data packets into a QoS flow, and adds QoS indication information in a data header of the QoS Flow. Based on QoS indication information, the RAN can find corresponding parameters according to QoS policies received, and perform corresponding processing using user plane data according to the parameters in the QoS policies to meet the quality requirements. The core network sends the data packets with QoS indication information to the RAN. The RAN maps the QoS Flow to resources and data radio bearer of the access network. For example, the RAN determines to map the QoS Flow to a data bearer DRB or creates a new data bearer DRB, for the QoS Flow.

When to create the new DRB is decided by the RAN, and may be after the RAN receives signaling from the core network or receives data of the QoS Flow user equipment, based on QoS indication information contained in the header of the QoS Flow, and based on QoS indication information together with default QoS policies saved by the RAN and/or pre-authenticated QoS policy, the RAN can know detailed QoS requirements corresponding to the QoS Flow. According to the QoS requirements, if a DRB currently established is suitable to bear data meet the QoS requirements, and then the QoS Flow is transmitted through the DRB. If not, the RAN may decide to establish a new DRB, and bear the QoS Flow using the new DRB.

Under the new technology, the traditional dual-connectivity establishment process is no longer applicable. For example, in a LTE system, a core network determines a data bearer corresponding to a certain QoS, a core network initiates data bearing, S1 interface bearers (referred to as an evolved radio access bearer (E-RAB)) and data radio bearers are one-to-one mapping, an S1 interface bearer corresponds to one tunnel in a user plane, and a RAN receive data from the tunnel, directly corresponding to the corresponding data radio bearer. In 5G, a NG interface has been able not to have the E-RAB concept. How the RAN determines the data radio bearer and how to establish dual-connectivity to transmit data, traditional methods are no longer applicable.

The present disclosure makes a research on how to establish dual-connectivity for a UE under a new technology, including solving the following issues:

1) how to establish a split bearer
2) how to establish an SCG bearer
3) how to notify a SCG bearer to a core network.

In new radio or 5G, during downlink, a user plane of a core network sends data to a base station. Through a NG interface, the core network sends data in the form of QoS Flow to the base station. The base station maps a QoS Flow to a data radio bearer (DRB) and transmits it to the UE. During uplink, the UE sends data to the base station, data is borne on a DRB, and the base station maps data on the DRB to a QoS Flow and transmits the QoS Flow to the core network. Therefore, a mapping function module is required on the base station to perform QoS Flow to DRB mapping (or, conversely, perform DRB to QoS Flow mapping). The mapping functions described in the following all include the above two modes of mapping. For convenience of description, only QoS Flow to DRB mapping is described.

Figure 7:
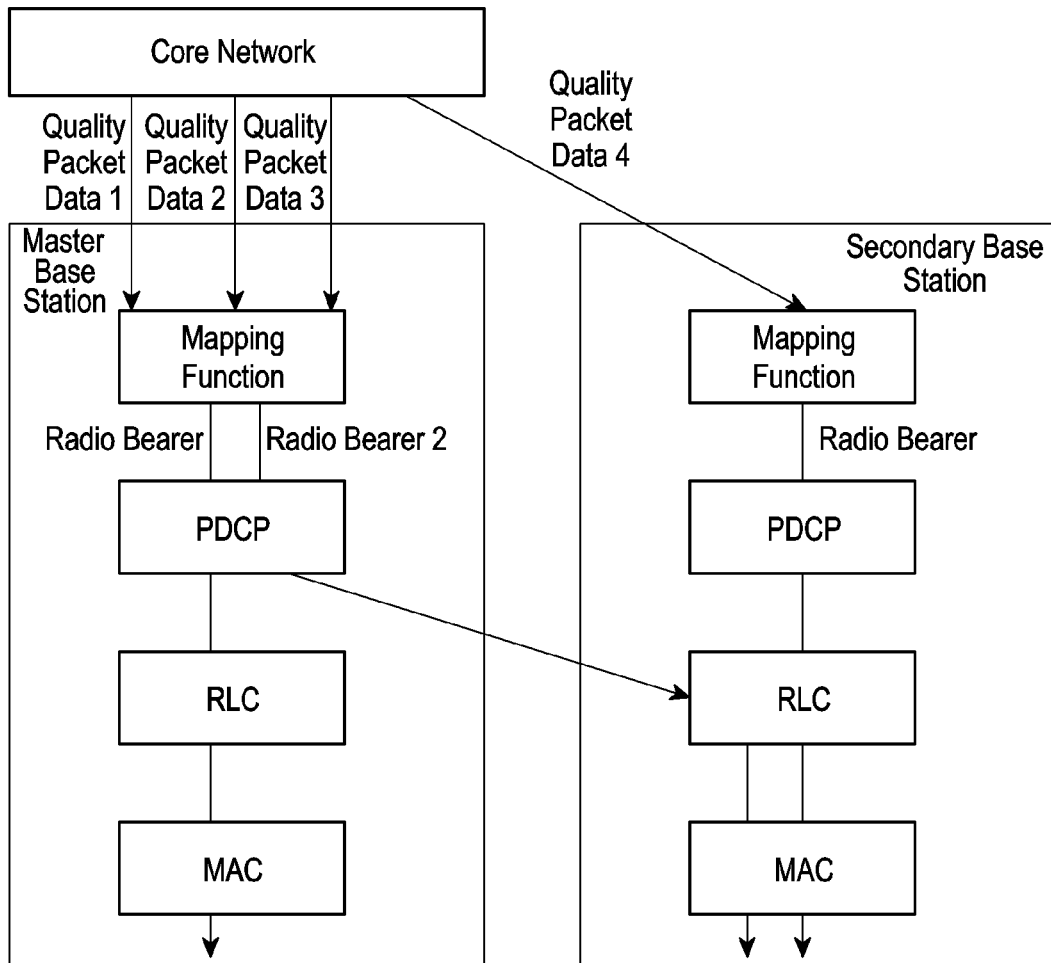
FIG. 7 is a schematic diagram of Embodiment 3 of the present disclosure.

FIG. 7 is an example of a user plane data transmission path. Between a core network and a base station, QoS Flow 1, QoS Flow 2, QoS Flow 3 and QoS Flow 4 are data all sent to a certain UE, where QoS Flow 1 and QoS Flow 2 belong to a same service data connection (PDU Session). QoS Flow 3 and QoS Flow 4 belong to another service data connection. QoS Flow 1, QoS Flow 2 and QoS Flow 3 are sent through a MeNB. According to QoS service quality requirements of QoS Flows, a mapping function on the MeNB maps QoS Flows with the same quality to a DRB. For example, the MeNB maps QoS Flow 1 and QoS Flow 2 to DRB1 and maps QoS Flow 3 to DRB2. If the MeNB decides to establish a split bearer, for example, establishing DRB2 on a SeNB, after being processed by a packet data convergence protocol (PDCP) on the MeNB, data is sent to the SeNB via an Xn interface. The SeNB processes data through RLC/MAC and sends data on DRB2 to the UE. If the MeNB decides to establish an SCG bearer, for example, sending QoS Flow 4 to the UE through the SCG bearer of the SeNB, the MeNB establishes the SCG bearer according to the following embodiments, data is sent from the core network to the SeNB, the mapping function of the SeNB maps the Flow of data to a DRB, and then the flow is processed by other user planes such as PDCP/RLC/MAC, and is sent to the UE.

Figure 4:
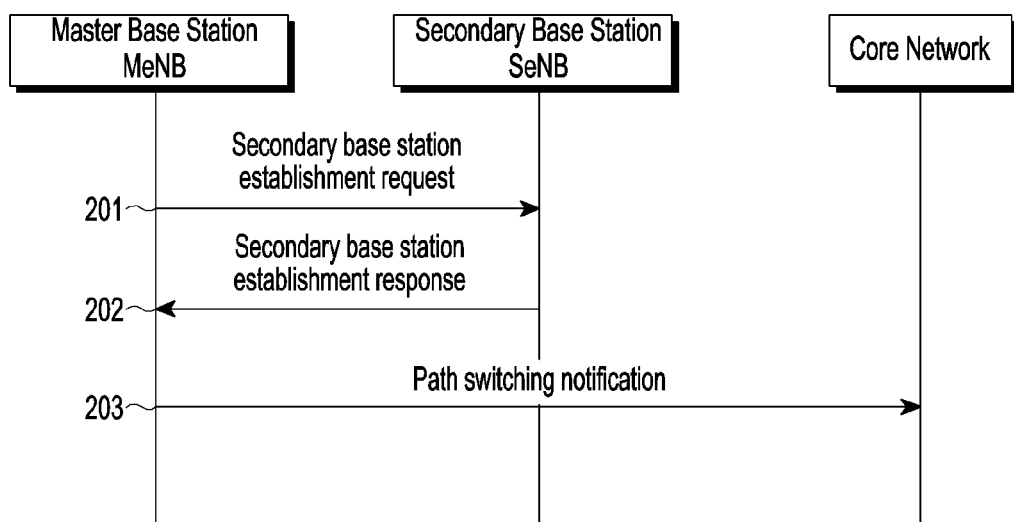
FIG. 4 is a schematic diagram of a method of the present disclosure.

FIG. 4 is a schematic diagram of a method of the present disclosure describing how a master base station and a secondary base station establish a split bearer and an SCG data bearer. In the following, a base station and a cell are not separately described. A master base station refers to a base station where a primary cell is located, and a secondary base station is a base station where a secondary cell is located.

Step 201: a master base station (a base station where a primary cell, PCell, of a UE is located) sends a secondary base station adding request message to a secondary base station.

According to a measurement report of the UE, the master base station decides to establish dual-connectivity according to a service quality requirement of a QoS Flow or DRB, that is, establishing a secondary base station (a base station where a secondary cell, SCell, of the UE is located), and data transmission is provided to the UE through bearers of the master base station and secondary base station at the same time. In this way, data transmission rate can be increased and the throughput of the system can be increased. When the base station where the PCell is located decides to add a cell as SCell, the base station where the PCell is located sends a secondary base station adding request message to the base station where the SCell is located. The secondary base station adding request message contains capability information of the UE, information of secondary cells of the secondary base station, an uplink data receiving address allocated by the core network, the said uplink data receiving address is received by the base station where the PCell is located from the core network, the base station where the PCell is located sends the uplink data receiving address through the secondary base station adding request message to the base station where the SCell is located.

If the master base station decides to establish a split bearer, the master base station performs QoS Flow to DRB mapping on the user plane, data after the mapping operation is processed by PDCP, and then is split. A part of PDCP PDU data is sent to the secondary base station. The master base station decides to establish a split bearer. The master base station sends a secondary base station adding request message to the secondary base station. The secondary base station adding request message carries information that can indicate a DRB of the MeNB, e.g., a DRB identity. Through the DRB identity, a user plane corresponding to the DRB identity can be uniquely determined. Or a user plane identity is defined. For example, the MeNB allocates a user plane identity, and this identity is used to indicate a user plane of an Xn interface where the split bearer is located. The secondary base station adding request message also carries QoS information corresponding to the DRB.

Quality (QoS) information includes at least one of the following: A. data delay target, B. data error rate, C. data priority, D. guaranteed data rate and E. maximum data rate. After receiving the secondary base station adding request message, the secondary base station configures a user plane for the split bearer according to QoS information, configures user plane configuration information of the UE side, and allocates transport layer information in the user plane on the Xn interface. For example, for each split bearer, the secondary base station allocates a tunnel endpoint or tunnel ID for it. Or the master base station sends a secondary base station adding request message to the secondary base station. The secondary base station adding request message carries information of a PDU session, for example, an identity of the PDU session, information of a QoS flow, such as QoS flow and quality requirement information corresponding to the QoS flow. After receiving the secondary base station adding request message, the secondary base station configures a user plane for the split bearer according to QoS information, configures user plane configuration information of the UE side, and allocates transport layer information of the user plane on the Xn interface. For example, for bearers belonging to a same PDU session, the secondary base station allocates a tunnel endpoint or tunnel ID for them.

If the master base station decides to establish an SCG bearer, there are three data processing methods for the SCG bearer. One is that QoS Flow to DRB mapping is carried out by the master base station, and other processing on the user plane is carried out by the secondary base station. Then, in the user plane, the SCG bearer is established between the master base station and the secondary base station. The master base station maps a QoS Flow to a DRB through the mapping function and then sends it to the secondary base station. Other processing on the user plane, e.g., PDCP/RLC/MAC, is performed on the secondary base station. The secondary base station then transmits data to the UE via an air interface.

The second method is that the MeNB decides a mapping principle of QoS Flow to DRB mapping and notifies the base station of the mapping principle. For example, the mapping principle is which QoS Flows are mapped to a same DRB. The mapping function of the secondary base station maps a QoS Flow to a data radio bearer according to the mapping principle. In this method, the secondary base station adding request message carries QoS Flow identity, the identity could be multiple, and DRB identity corresponding to the QoS Flow(s). In this way, the secondary base station may map data indicated by the QoS Flow identities to a same DRB. The secondary base station adding request message also carries specific information about the QoS corresponding to the DRB, or carries a QoS policy. How the QoS policy is carried will be described in detail in the following third method.

The third method is that for an SCG bearer, QoS Flow to DRB mapping is carried out by the secondary base station. The secondary base station obtains a QoS Flow policy, decides how to perform QoS Flow to DRB mapping according to QoS information of a QoS Flow and its resources, and transmits configuration information of a DRB to the UE. In this method, the secondary base station adding request message of step 201 needs to contain a QoS Flow identity which indicates which QoS Flow is configured as the SCG bearer. The message may include one or more QoS flow identity(s). The secondary base station adding request message also contains detailed QoS information of a QoS Flow on a SCG bearer. Or the secondary base station adding request message contains a QoS policy of the QoS Flow, and the QoS policy is sent to the master base station by the core network, and the master base station forwards the QoS policy to the secondary base station. The master base station may send all QoS policies to the secondary base station or send only a QoS policy corresponding to a QoS Flow connected to the secondary base station to the secondary base station. The secondary base station adding request message also needs to carry an identity of a PDU session corresponding to the QoS Flow. In the second method and the third method, because a tunnel between a secondary base station and the core network needs to be allocated to the secondary base station, for a same PDU session, in order to reduce the number of tunnels, only one tunnel is allocated. Data of a whole PDU session is sent to the base station through a same tunnel. Thus, the secondary base station needs to know which QoS Flows among the QoS Flows carried by the secondary base station belong to a same PDU session and data thereof can be transmitted through a same tunnel. An identity of the PDU session is sent by the master base station to the secondary base station, and therefore, the master base station needs to know the relationship between PDU sessions and QoS Flows, that is, which QoS Flows belonging to a same PDU session. The master base station may obtain an identity of a PDU Session and an identity of a corresponding QoS Flow through signaling sent from the core network, e.g., a PDU Session establishment request message, or through information of a PDU Session carried in an identity of a QoS Flow, and knows whether QoS Flows belong to a same PDU Session according to identities of the QoS Flow. For example, QoS Flow identities of QoS Flows belonging to a same PDU session have the same part. So the master base station and the secondary base station may know whether QoS Flows belong to a same PDU Session according to their QoS Flow identities.

An adding request message sent by the master base station contains PDU Sessions identities and QoS Flow identities, and the secondary base station may know which QoS Flow belong to a same PDU Session according to the PDU Sessions identities and the QoS Flow identities, so as to decide whether to allocate a new tunnel or reuse an established tunnel. For example, if the secondary base station has not yet established a user plane tunnel for the PDU session, the secondary base station allocates a tunnel identity for a new user plane tunnel to receive the downlink data, and sends the tunnel identity to the core network through the master base station. If a user plane tunnel has been established between the secondary base station and the core network for the PDU session, the secondary base station sends a tunnel identity of the user plane tunnel to the core network through the master base station. If a user plane tunnel can be established for each QoS Flow between the secondary base station and the core network, then the secondary base station only needs to know QoS Flow information, and the master base station does not need to send PDU Session identities to the secondary base station.

In summary, the secondary base station adding request message may contain one or more pieces of following information:

dDRB identity (or/and an identity of an Xn user plane of a Split bearer)

QoS Flow identity

QoS Flow policy (or QoS specific requirements)

PDU Session identity

DRB in the present disclosure may be changed to other terms, e.g., Xn bearer or data bearer, as long as there is a mapping relationship between Xn bearer or data bearer and DRB. If DRB is changed to other terms, DRB identity should be changed accordingly, e.g., changed to Xn bearer identity or data bearer identity. In information sent to the UE by the base station, DRB is used to identify a radio bearer, and on an Xn interface, other terms may be used to identify a bearer on the Xn interface, but there should be a mapping relationship between the terms and DRB, so the base station can know from the mapping relationship that data on the bearers are one to one mapping. The mapping relationship may use the same value as that is currently used.

Step 202: The secondary base station sends a secondary base station adding response message to the master base station.

The secondary base station adding response message carries configuration information for a bearer of the UE. Configuration information configured for the UE by the secondary base station is sent to the master base station by being carried in an RRC container. The master base station does not resolve the RRC container but forwards the RRC container to the UE. The secondary base station adding response message carries transport layer information of the user plane allocated to the bearer. For example, for each split bearer, the secondary base station allocates a tunnel identity. For a SCG bearer, the secondary base station allocates a tunnel identity for each PDU session or allocates a tunnel identity for each QoS Flow, or allocates a tunnel identity for each DRB.

In summary, the secondary base station adding response message may contain one or more pieces of following information:

DRB identity (or an identity of an Xn user plane of a Split bearer)
QoS Flow identity
PDU Session identity
Transport layer information, such as tunnel identity
RRC container Step 203: The master base station sends a bearer modification message to the core network.

The bearer modification message contains a QoS Flow identity and its corresponding transport layer information for downlink receiving, such as an IP address and a tunnel identity, or contains a PDU Session identity, a QoS Flow identity and an IP address and a tunnel identity for downlink receiving allocated for a PDU Session.

Figure 5:
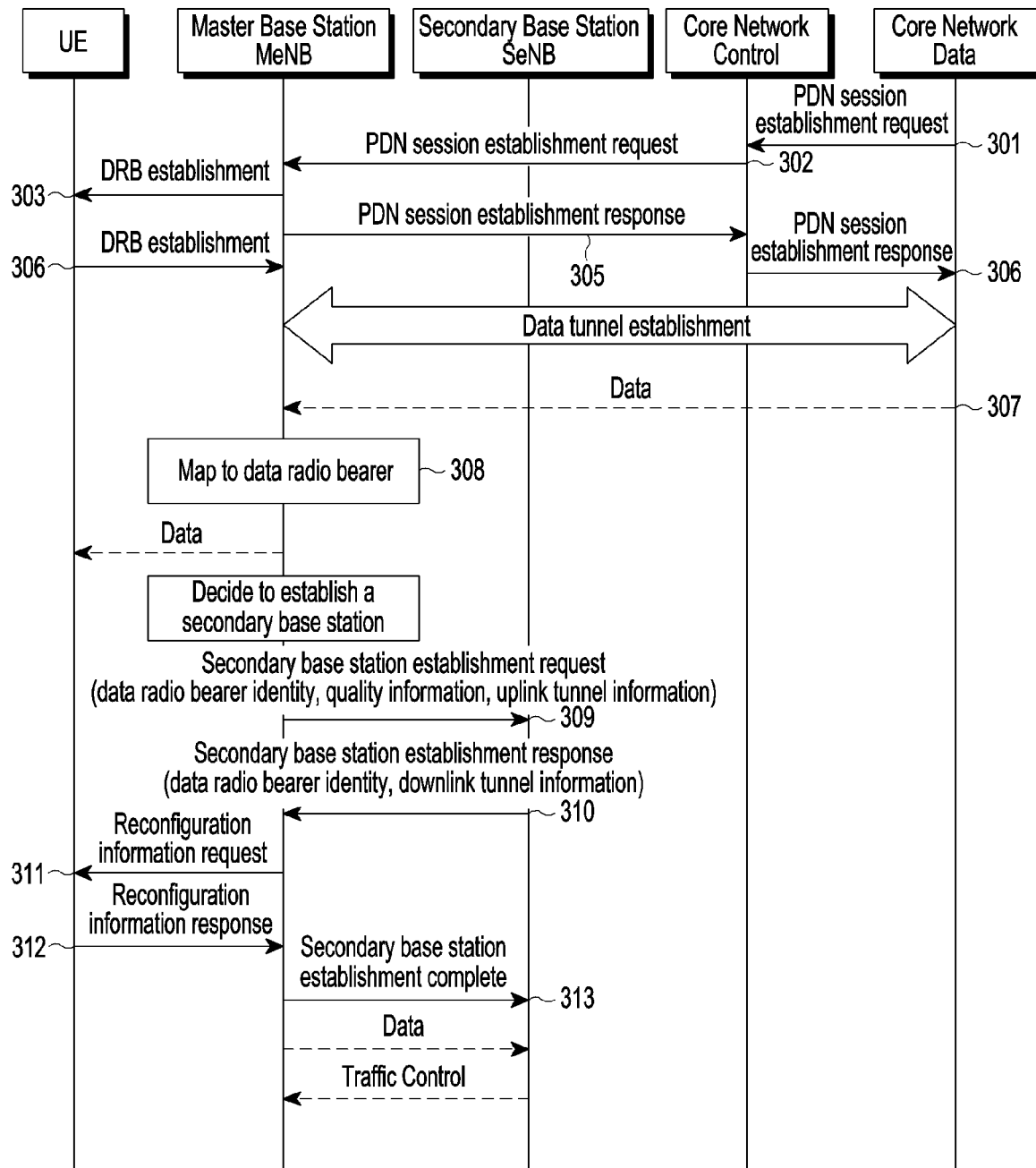
FIG. 5 is a schematic diagram of Embodiment 1 of the present disclosure.

In summary, the bearer modification message may contain one or more pieces of following information:

QoS Flow identity
PDU Session identity
Transport layer information such as IP address and tunnel identity FIG. 5 is a schematic diagram of a flow of establishing a split bearer for a service according to the present disclosure. The flow includes the following steps.

Step 301, a control plane node of a core network receives a PDU session establishment request message. The PDU session establishment request message may be sent to a control plane by a user plane node of the core network or by other nodes of the core network.

The PDU session establishment request is to establish a data connection from the core network to the UE for a service of the UE. The PDU session establishment request message contains configuration information of PDU data. A PDU session may consist of multiple QoS Flows. The QoS requirement for each QoS Flow is different and the PDU session establishment request message may contain a QoS Flow identity and a corresponding specific QoS requirement. The PDU session establishment request message may also contain a default QoS policy and a preconfigured QoS policy. The QoS policies contain the QoS Flow indication/description information and specific QoS information. Specific quality (QoS) information includes at least one of the following: A. data delay target, B. data error rate, C. data priority, D. guaranteed data rate and E. maximum data rate, and may contain other information such as application layer information.

Step 302, the core network sends a message to a base station of an access network.

The control node of the core network sends a PDU session establishment request message to the base station. The PDU session establishment request message carries a PDU session identity which uniquely identifies a service of a UE. The PDU session establishment request message also carries transport layer information of the user plane of the core network, such as an IP address and a tunnel identity, which identifies an uplink receiving address of a data path. The PDU session establishment request message also carries a default QoS policy and/or a preconfigured QoS policy. The QoS policies contain QoS Flow indication information and/or description information (ID or descriptor), and contains specific QoS information. Specific quality (QoS) information contains at least one of the following: A. data delay target, B. data error rate, C. data priority, D. guaranteed data rate, E. maximum data rate and other information, e.g., application layer information. Data of a PDU Session may have multiple different QoS Flows, and each QoS Flow may have its corresponding processing policy. A PDU Session establishment request message may contain multiple QoS policies. The PDU Session establishment message may also carry information to be sent by the core network to the UE, and this information may be borne through a non-access stratum container (NAS container).

After the base station receives the PDU session establishment request message, it performs the following operations: the base station saves a received QoS policy and performs subsequent user plane data processing according to the QoS policy. The base station receives the PDU Session establishment request message, and according to the QoS policy, establishes at least one default data radio bearer (DRB). The base station may also establish other data bearers at the same time.

Step 303, the base station sends a message to the UE.

The base station sends a RRC configuration request message to the UE, and the RRC configuration request message carries the QoS policy sent by the core network to the UE. The QoS policy may be transmitted to the UE through the non-access stratum container (NAS container), and may include configuration information of a DRB configured by the base station to the UE.

Step 304, the UE sends a message to the base station.

The UE sends a RRC configuration complete message to the base station. The RRC configuration complete message carries acknowledgement information indicating that the UE has successfully configured the DRB.

Step 305, the base station sends a PDU session establishment success message to the core network.

After the configuration by the base station is completed, the base station sends an acknowledgement message to the control node in the core network. The acknowledgement message carries transport layer information allocated by the base station to the user plane, e.g., an IP address and a tunnel identity for downlink data receiving.

Step 306, the control node of the core network sends a message to the user plane node.

If the control node and the user plane node of the core network are separate, the control node sends the message to the user plane node. The message carries information about a QoS Flow, e.g., an identity of a PDU Session, identity/description information of the QoS Flow and transport layer information allocated for the user plane of the PDU Session, e.g., the IP address and the tunnel identity for downlink data receiving.

A PDU Session may establish only one tunnel between the user plane of the core network and the base station.

Step 307, user plane data can be transmitted. For example, in downlink, the core network forms data packets into a QoS Flow, adds QoS indication information in a data header of the QoS Flow, and sends the data packets with QoS indication information to a RAN. In case of non-guaranteed reliable transmission data (non-GBR), the core network does not need to initiate control plane signaling, but directly sends data to the RAN node, i.e., the base station after foregoing processing.

Step 308, the base station receives user plane data, obtains QoS information of a data packet according to header information of the data packet, and the base station should have a QoS Flow to DRB mapping function. The mapping function module maps one or more QoS flows to a DRB, and a mapping principle mainly refers to QoS of the QoS Flow. For example, the packet header indicates QoS Flow-1. According to the saved QoS policy, the specific QoS requirement corresponding to QoS Flow-1 can be known, and a default DRB or a certain DRB that has been established can meet the QoS requirement. The base station may decide to send the data packet to the UE via an appropriate DRB. If there are multiple QoS Flows, e.g., QoS Flow-1, QoS Flow-2 and QoS Flow-3, where QoS Flow-1 and QoS Flow-3 have the same or close QoS requirements, the base station may map data of QoS Flow-1 and QoS Flow-3 to a same DRB to transmit. After data is processed by the mapping function, through processing in the layer 2, for example via the PDCP/RLC/MAC layer, it is sent to the UE through an air interface.

Step 309, the master base station sends a secondary base station adding request to a target secondary base station.

The primary cell of the UE on the base station receives a measurement report of the UE, and the signal quality of a cell on a neighboring base station satisfies the requirement. The primary cell on the master base station decides to establish a secondary cell on the secondary base station so that data transmission is shared through dual-connectivity. The base station decides to transmit data of one or several DRBs originally on the MeNB through the secondary base station, i.e., establishing a Split bearer. When the base station where the PCell is located decides to add a cell as SCell, the base station where the PCell is located sends a secondary base station adding request message to the base station where the SCell is located. The secondary base station adding request message contains capability information of the UE, information including the secondary cells on the secondary base station, an uplink data receiving address allocated by the core network, the uplink data receiving address is obtained from the core network by the based station where the PCell is located, and the base station where the PCell is located sends the uplink data receiving address to the base station where the SCell is located through the secondary base station adding request message.

The master base station sends a secondary base station adding request message to the secondary base station. The secondary base station adding request message carries information that can indicate a DRB on the MeNB, for example, carrying a DRB identity, and through the DRB identity, a user plane corresponding to the DRB is uniquely identified. Or a user plane identity may be defined, for example, the MeNB allocating a user plane identity to identify a corresponding user plane. The secondary base station adding request message also carries a QoS requirement for the DRB. After receiving the secondary base station adding request message, the secondary base station configures a user plane for the split bearer according to the QoS requirement, configures user plane configuration information at the UE side, and the secondary base station allocates transport layer information of a user plane on an Xn interface. For example, for each split bearer, the secondary base station allocates a tunnel identity.

In another implementation, the master base station sends a secondary base station adding request message to the secondary base station. The secondary base station adding request message carries information about a PDU session, e.g., an identity of the PDU session, information of a QoS flow, e.g., a QoS Flow identity list, and Quality requirement information corresponding to the QoS Flow. After receiving the secondary base station adding request message, the secondary base station configures a user plane for the split bearer according to the quality requirement of the QoS, configures user plane configuration information of the UE side, and the secondary base station allocates transport layer information for the user plane on the Xn interface. For example, for bearers belonging to a same PDU session, the secondary base station allocates a tunnel identity, TEID, for it.

Step 310, the secondary base station sends a secondary base station adding response message to the master base station.

The secondary base station determines configuration information of bearers on the UE according to the QoS of the DRB and the UE capability. The target base station includes configuration information of a secondary bearer or a secondary cell on the UE in an RRC container, and forwards the RRC container to the UE through the master base station. The UE sets UE layer protocols, such as RLC and MAC layers, according to the configuration. The secondary base station adding response message also carries a DRB identity or an identity of an Xn user plane, and transport layer information corresponding to the Xn user plane, e.g., a tunnel identity. If the secondary base station allocates a tunnel identity TEID to bearers that belong to a same PDU session, the secondary base station adding response message sent by the secondary base station contains a PDU session identity and a tunnel identity TEID allocated to the PDU. In this case, traffic control of the user plane also needs to be modified. A detailed traffic control procedure is described in the embodiment of FIG. 9.

Step 311, the master base station sends a RRC reconfiguration request to the UE.

The master base station does not resolve the RRC container, but forwards the RRC container to the UE. The master base station may send configuration information for the UE by it together with information configured by the secondary base station.

Step 312: The UE sends a RRC reconfiguration complete message to the master base station.

After the UE is configured successfully, the UE sends a response message to the master base station. The response message contains the response to configuration information sent by the step 311. That is, the response message not only includes a response to configuration information of the master base station but also includes a response to configuration information of the secondary base station. If necessary, the UE also needs to perform a random access procedure with the new secondary base station and synchronize with the new secondary base station. After synchronization, the secondary base station may begin to send data to the UE.

Step 313: The master base station sends the RRC reconfiguration complete message to the secondary base station.

The master base station notifies the secondary base station that the UE side has been successfully configured. Since the UE sends an acknowledgment message to the master base station, the master base station needs to forward the acknowledgment message to the secondary base station. If the master base station can not resolve the response of the UE to configuration information of the secondary base station, the master base station may also forward the response of the UE to configuration information of the secondary base station in the form of RRC container to the secondary base station. For example, the master base station is an eLTE base station, the secondary base station is a 5G base station gNB, or the master base station is a 5G base station, and the secondary base station is an eLTE base station.

After that, data is transmitted from the master base station to the secondary base station. The secondary base station also sends traffic control information to the master base station.

At this point, the Split bearer setup process is complete.

Figure 6:
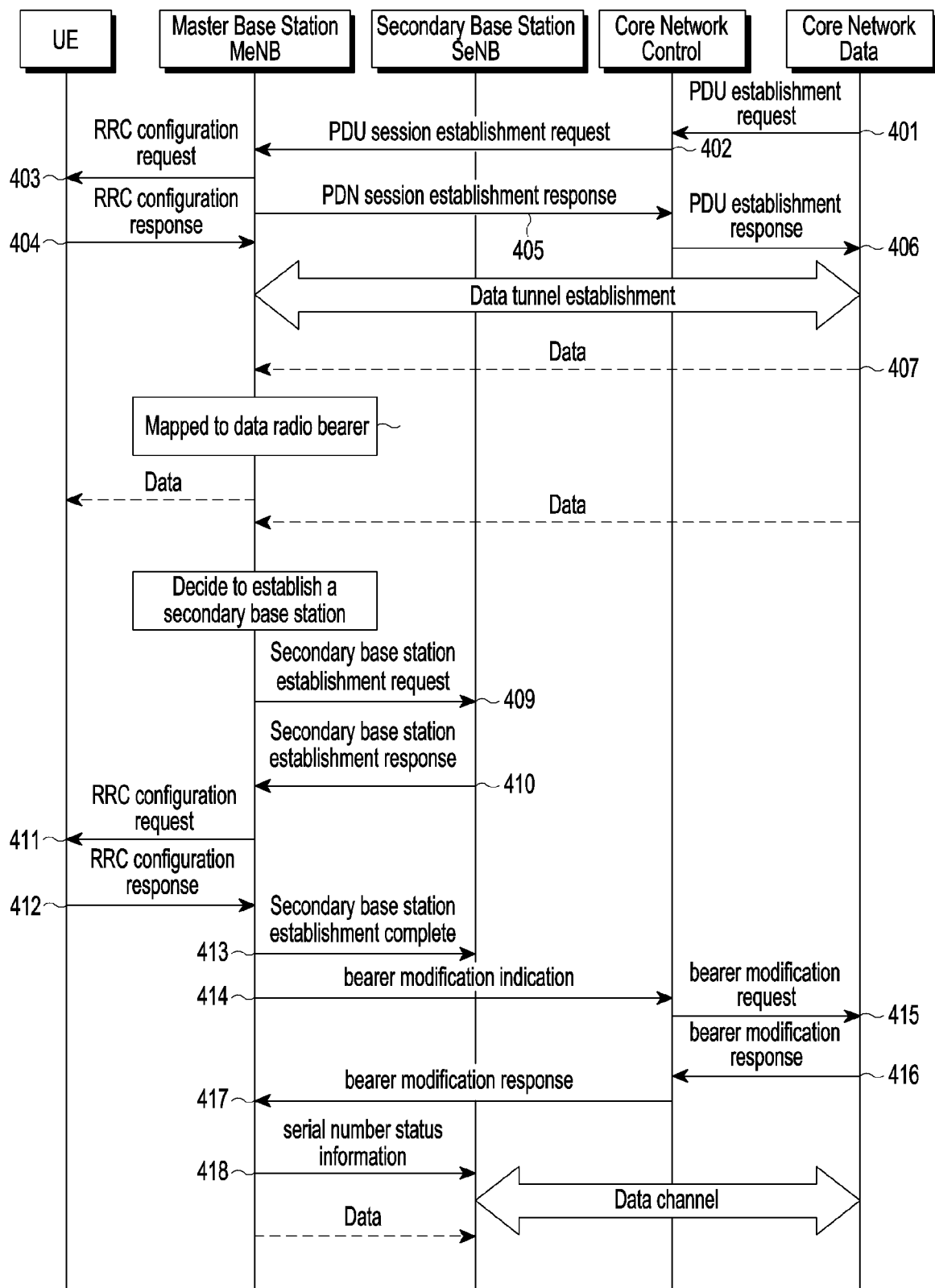
FIG. 6 is a schematic diagram of Embodiment 2 of the present disclosure.

FIG. 6 is a schematic diagram of a flow chart of establishing an SCG bearer for a service in the present disclosure. The flowchart includes the following steps:

Step 401, a control plane node of a core network receives a PDU session establishment request message. The PDU session establishment request message may be sent by a user plane node of the core network to the control plane or by other nodes of the core network to the control plane.

The PDU session establishment request establishes a data connection from the core network to a UE for a service of the UE. The PDU session establishment request message contains configuration information of PDU data. A PDU session may consist of multiple QoS Flows. Each QoS has different QoS requirements, and the PDU session establishment request message may include an identity of a QoS Flow and a specific QoS requirement corresponding to the QoS Flow. The PDU session establishment request message may also include a default QoS policy and a preconfigured QoS policy. The QoS policies contain QoS Flow indication/description information, and contain specific QoS information. Specific quality (QoS) information includes at least one of the following: A. data delay target, B. data error rate, C. data priority, D. guaranteed data rate, E. maximum data rate and other information, e.g., application layer information.

Step 402, the core network sends a message to a base station of an access network.

The control node of the core network sends a PDU session establishment request message to the base station. The PDU session establishment request message carries an identity of a PDU session which uniquely identifies a service of the UE. The PDU session establishment request message also carries transport layer information of the user plane of the core network, e.g., an IP address and a tunnel identity, which identifies an uplink receiving address of a data path. The PDU session establishment request message also carries a default QoS policy and/or a preconfigured QoS policy. The QoS policies contain the QoS Flow indication information/description information (an ID or descriptor), and contain specific QoS information. Specific quality (QoS) information contains at least one of the following: A. data delay target, B. data error rate, C. Data priority, D. guaranteed data rate, E. maximum data rate and other information, e.g., application layer information. Data of a PDU Session may have multiple different QoS Flows, each QoS Flow may have its corresponding processing policy, and a PDU Session establishment request message may include multiple QoS policies. The PDU Session establishment request message may also carry information to be sent by the core network to the UE, which may be borne through a non-access stratum container (NAS container).

After the base station receives the PDU Session establishment request message, it may perform the following operations: the base station saves a received QoS policy and performs subsequent user plane data processing according to the QoS policy. The base station receives the PDU Session establishment request message, and according to the QoS policy, at least needs to establish at least one default data radio bearer (DRB). The base station may also establish other data bearers at the same time.

Step 403, the base station sends a message to the UE.

The base station sends an RRC configuration request message to the UE, and the RRC configuration request message carries the QoS policy sent by the core network to the UE. The QoS policy may be transmitted to the UE through a non-access stratum container (NAS container), and contains configuration information of a DRB configured by the base station to the UE.

Step 404, the UE sends a message to the base station.

The UE sends an RRC configuration complete message to the base station. The RRC configuration complete message carries an acknowledgement message that confirms the UE has successfully configured the DRB.

Step 405, the base station sends a PDU session establishment success message to the core network.

After the base station is configured, the base station sends an acknowledgement message to the control node inside the core network. The acknowledgement message carries transport layer information allocated by the base station to the user plane, e.g., an IP address and a tunnel identity for downlink data receiving.

Step 406, the control node of the core network sends a message to the user plane node.

If the control node and the user plane node of the core network are separate, the control node sends a message to the user plane node. The message carries information of a QoS Flow, e.g., a PDU session identity, QoS Flow identity/description information and transport layer information allocated for the user plane of the PDU Session by the base station, e.g., an IP address and a tunnel identity for downlink data receiving.

One PDU Session may establish only one tunnel between the user plane of the core network and the base station.

Step 407, data of the user plane can be sent. For example, in downlink, the core network forms data packets into a QoS Flow, and adds QoS indication information in a data header of the QoS Flow, and sends the data packets with QoS indication information to the RAN. In case of non-guaranteed reliable transmission of data (non-GBR), the core network does not need to initiate control plane signaling, but directly sends processed data to the RAN node, i.e., the base station.

Step 408, the base station receives data of the user plane, and obtains QoS information of a data packet according to header information of the data packet, and the base station needs to have a QoS Flow to DRB mapping function. The mapping function module maps one or more QoS flows to a DRB, and a mapping principle mainly refers to a QoS of a QoS Flow. For example, the packet header indicates QoS Flow-1, and according to the saved QoS policy, a specific QoS requirement corresponding to QoS Flow-1 can be known. An established default DRB or a DRB can meet the QoS requirement, and the base station may decide to transmit the data packet to the UE through a proper DRB. If there are multiple QoS Flows, e.g., QoS Flow-1, QoS Flow-2 and QoS Flow-3, where QoS Flow-1 and QoS Flow-3 have the same or close QoS requirements, the base station may map data of the QoS Flow-1 and QoS Flow-3 to the same DRB and transmit it. After data is processed by the mapping function, it is processed via layer 2, then processed via PDCP/RLC/MAC layer, and is sent to the UE through an air interface.

Step 409, the master base station sends a secondary base station adding request message to the secondary base station.

The primary cell of the UE on the base station receives a measurement report of the UE, and the signal quality of a cell on a neighboring base station satisfies the requirement. The primary cell on the master base station decides to establish a secondary cell on the secondary base station so that data transmission is shared through dual-connectivity. The base station decides to transmit data of one or several QoS Flows originally on the MeNB through the secondary base station, i.e., establishing an SCG bearer. The base station sends a secondary base station adding request to the secondary base station, and the secondary base station adding request message contains capability information of the UE, information including secondary cells on the secondary base station, an uplink receiving address allocated by the core network, and an uplink receiving address of a data path obtained by a base station where the PCell is located from the core network, and the base station where the PCell is located sends the uplink receiving address of the data path to the base station where the SCell is located through the secondary base station adding request message.

If the master base station decides to establish a SCG bearer, there are two data processing methods for the SCG bearer. One is that QoS Flow to DRB mapping is carried out by the master base station, and other processing of the user plane is carried out by the secondary base station. Through processing by the mapping function, the master base station maps the QoS Flow to a DRB, and sends it to the secondary base station. Other processing of the user plane is carried out by the secondary base station. The master base station sends a secondary base station adding request message to the secondary base station. The secondary base station adding request message carries information that can indicate the DRB on the MeNB, e.g., a DRB identity, and through this DRB identity, a user plane corresponding to the DRB identity is uniquely identified. Or a user plane identity is defined, for example, the MeNB allocates a user plane identity and uses it to identify a corresponding user plane. The message also carries a QoS requirement corresponding to the DRB. After the secondary base station receives the message, it configures a user plane for the SCG bearer according to the QoS requirement, and configures user plane configuration information of the UE, and the secondary base station also allocates transport layer information of the user plane on the Xn interface. For example, for each SCG bearer, the base station allocates a tunnel identity for it.

The second method is that the MeNB determines QoS Flow to DRB mapping, and notifies a determined result to the secondary base station. The secondary base station maps a QoS Flow to a DRB according to a configuration of the MeNB. In this method, the secondary base station adding request carries a QoS Flow identity, and there may be multiple QoS Flow identities, and the secondary base station adding request carries an identity of a DRB corresponding to the QoS Flows. Thus, the secondary base station may map data indicated by the QoS Flow identity to a same DRB. The message also carries QoS information corresponding to the DRB, or a QoS policy of the QoS Flow. The carrying method will be described in the third method as follows.

The third method is that for a SCG bearer, QoS Flow to DRB mapping is carried out by the secondary base station itself. The secondary base station gets a QoS Flow policy, according to a QoS requirement of the QoS Flow and resources of the secondary base station, the secondary base station decides how to perform QoS Flow to DRB mapping, and transmits configuration information of the DRB to the UE through the master base station. In this method, the secondary base station adding request message for this step contains a QoS Flow identity which shows which QoS Flow should be configured as an SCG bearer. The secondary base station adding request message may include one or more QoS Flow identities. The secondary base station adding request message also contains specific QoS requirements for the QoS Flow on the SCG bearer or the QoS policy of the QoS Flow which is sent by the core network to the master base station, and the master base station forwards the QoS policy to the secondary base station. The master base station may send all QoS policies to the secondary base station or send only a QoS policy corresponding to a QoS Flow connected to the secondary base station to the secondary base station. The secondary base station adding request message also needs to carry an identity of a PDU session corresponding to the QoS Flow. In the second method and the third method, because the secondary base station needs to allocate a tunnel between the core network and the secondary base station, for a same PDU session, in order to reduce the number of tunnels, only one tunnel is allocated, and data of the whole PDU session is sent to the base station through the same tunnel. In this way, the secondary base station needs to know among the QoS Flows borne by the secondary base station, which QoS Flows belong to a same PDU session and data of which QoS Flows can be transmitted through a same tunnel. The PDU Session is sent from the master base station to the secondary base station, so the master base station need to know a relationship between PDU Sessions and QoS Flows, that is, which QoS Flows belonging to a same PDU Session. The master base station may know identities of PDU Sessions and corresponding identities of QoS Flows from signaling sent from the core network, e.g., a PDU Session establishment request message. Or the master base station knows whether QoS Flows belong to a same PDU Session according to identities of the QoS Flows by information of the PDU sessions carried in the identities of the QoS Flows. For example, identities of QoS Flows belonging to a same PDU session have the same part. In this way, the master base station and the secondary base station know whether QoS Flows belong to a same PDU Session according to identities of the QoS Flows. If a tunnel may be established for each QoS Flow between the secondary base station and the core network, the master base station does not need to send a PDU Session identity to the secondary base station.

For a SCG bearer, if the master base station is switched to the secondary base station, the master base station needs to forward cache data to the secondary base station. If there are multiple QoS flows on the SCG bearer, the master base station may decide to switch one of the QoS flows on the secondary base station to the master base station, but the SCG bearer remains on the secondary base station. In the secondary base station adding request message sent from the master base station, the master base station allocates an uplink address TEID of data forwarding. When a QoS flow is switched to the master base station, the secondary base station sends cache data to the uplink address. According to a quality requirement of the QoS flow and cache, the master base station may suggest that data of some QoS flows need to be forwarded. Therefore, the secondary base station adding request message also carries identities of the QoS flows, data of which is suggested to be forwarded. In the second method above, the data forwarding can be suggested per DRB.

Step 410, the secondary base station sends a secondary base station adding response message to the master base station.

The secondary base station determines configuration information of bearers on the UE according to the QoS of the DRB and the capability of the UE, and the target base station contains configuration information of the secondary bearer or secondary cell of the UE in a RRC container and forwards the RRC container to the UE through the master base station. The UE sets protocols of respective layers such as PDCP, RLC and MAC layers at the UE side according to configuration information. The message also carries an identity of the DRB or an identity of an Xn user plane, and transport layer information corresponding to the DRB or the Xn user plane, e.g., a tunnel identity. Or the message contains a PDU session identity and/or QoS Flow identity, the secondary base station allocates a tunnel identity for each PDU session, or allocates a tunnel identity for each QoS Flow. If the secondary base station allocates a tunnel ID for each PDU session, the message contains IDs of PDU sessions. The secondary base station refers to the suggestion information of the master base station and configuration information of the radio bearer of the base station in the target cell, determines data of which QoS Flows need to be forwarded, and transmits identities of QoS Flows, data of which need to be forwarded, and information indicating forwarding is required. The information indicating forwarding is required may contain the transport layer information for data forwarding allocated by the secondary base station, such as IP address and tunnel identity. Beside the data forwarding for QoS flow, the data forwarding may be per DRB, the message carry the DRB identify and the corresponding transport layer information for data forwarding allocated by the secondary base station, such as IP address and tunnel identity. To be specific, the mechanism of data forwarding may be one of the following:

a: Establish a data forwarding tunnel for PDU Session between the master base station and the secondary base station. The secondary base station creates a tunnel identity for data forwarding for a PDU Session, and sends the tunnel identity to the master base station. Data belonging to a same PDU Session are forwarded through a same tunnel. During data forwarding, the header of a data packet contains an identity of a QoS Flow, and based on the identity of the QoS Flow, the secondary base station maps the QoS Flow to a DRB. Data saved by the master base station may be a data packet that has not be mapped to a DRB, and when the data packet was sent from the core network to the master base station, the header of the data packet had carried the identity of the QoS Flow, and the master base station may send the data packet to the secondary base station directly. The master base station also saves a data packet that has been mapped to a DRB, and the data packet mapped to the DRB is sent to the PDCP protocol layer. If the PDCP protocol layer wants to know an identity of a QoS Flow corresponding to the PDCP data packet, it may know it from interaction information between internal protocol layers. When the master base station forwards the PDCP data packet, it sends the PDCP data packet through a channel corresponding to a PDU Session, and the tunnel protocol is GTP-U protocol, and in a GTP-U packet header, the identity of the QoS Flow is contained to indicate the QoS Flow corresponding to the PDCP data packet forwarded.

b: Establish a data forwarding tunnel for DRB between the master base station and the secondary base station. The secondary base station allocates a tunnel identity for data forwarding for each DRB. In the second method, the MeNB decides the QoS Flow to DRB mapping, notifies a decision to the secondary base station, and the secondary base station maps a QoS Flow to a DRB according to a configuration by the MeNB. The secondary base station creates a tunnel identity for data forwarding for the DRB, and notifies the tunnel identity to the master base station. Data belonging to a same DRB are forwarded through a same tunnel. This way of forwarding is similar to current dual-connectivity data forwarding methods. Data saved by the master base station may be a data packet that has not been mapped to a DRB, and when the data packet was sent from the core network to the master base station, the header of the data packet had contained an identity of a QoS Flow, and for data forwarding, the master base station needs to map the data to a DRB, and forward the data to the secondary base station through a tunnel corresponding to the DRB. The secondary base station receives the forwarded data and sends the data packet to the UE through the corresponding DRB.

c: Combine method a and method b, and establish two data forwarding tunnels between the master base station and the secondary base station, in which one is for PDU Session, and the other is for DRB. The secondary base station adding response message sent by the secondary base station may include a PDU Session identity and corresponding tunnel information, such as an IP address and a tunnel identity, or may include a DRB identity and corresponding tunnel information, such as an IP address and a tunnel identity. Data saved on the master base station may be a data packet that has not been mapped to a DRB. The header of the data packet had carried an identity of a QoS Flow when the data packet was sent from the core network to the master base station. The master base station sends the data packet through the tunnel for PDU Session. When the secondary base station receives the forwarded data, it maps the data packet to a DRB and sends the data packet through the DRB to the UE. The master base station also saves a data packet that has been mapped to a DRB, and sends the data packet mapped to the DRB to the PDCP protocol layer, and the data packet saved on the PDCP protocol layer is sent through the tunnel for DRB. When the secondary base station receives the forwarded data, it sends data packet to the UE through the corresponding DRB.

It is to be noted that, though the data forwarding methods in the above are described in the embodiment for SCG bearer establishment, the methods of the present disclosure are also applicable to other bearing modes. In this case, what needs to do is to change the bearer type of the present disclosure to the corresponding bearer type.

Step 411, the master base station sends an RRC reconfiguration request message to the UE.

The master base station does not resolve the RRC container but forwards the RRC container to the UE. The master base station may send configuration information configured for the UE by it to the UE together with the information configured by the secondary base station.

Step 412: The UE sends an RRC reconfiguration complete message to the master base station.

After the UE is configured successfully, the UE sends a response message to the master base station. The response message contains a response to configuration information sent in the step 411, that is, a response to configuration information configured by the master base station, and also contains a response to configuration information of the secondary base station. If necessary, the UE also needs to perform a random access procedure with the new secondary base station and synchronize with the new secondary base station. After synchronization, the secondary base station can begin sending data to the UE.

Step 413: The master base station sends an RRC reconfiguration complete message to the secondary base station.

The master base station notifies the secondary base station that the UE side has been successfully configured. Since the UE sends an acknowledgment message to the master base station, the master base station needs to forward the acknowledgment message to the secondary base station. If the master base station can not resolve the response of the UE to configuration information of the secondary base station, the master base station may also forward the response of the UE to the secondary base station configuration information in the form of the RRC container to the secondary base station. For example, the master base station is an eLTE base station, the secondary base station is a 5G base station gNB, or the master base station is a 5G base station, and the secondary base station is an eLTE base station.

Step 414: The master base station sends a bearer modification request message to a control node of the core network.

The bearer modification request message contains an identity of a QoS Flow and transport layer information for downlink receiving corresponding to it, e.g., an IP address and a tunnel identity, or contains PDU Session and QoS Flow identities and an IP address and tunnel ID for downlink receiving allocated to the PDU Session.

Step 415: The control node of the core network sends a bearer modification request message to a user node of the core network to notify new transport layer information for downlink receiving.

Step 416: The user node of the core network sends a bearer modification response message to the control node of the core network to confirm receipt of the message of step 415.

Step 417: The control node of the core network sends a bearer modification response message to the base station to confirm receipt of the message of step 415.

Step 418: If there is data forwarding, the master base station initiates a data forwarding step and sends serial number status information to the secondary base station. The secondary base station sets a serial number of user data by reference to this information.

At this point, the SCG bearer establishment process is complete.

Figure 8:
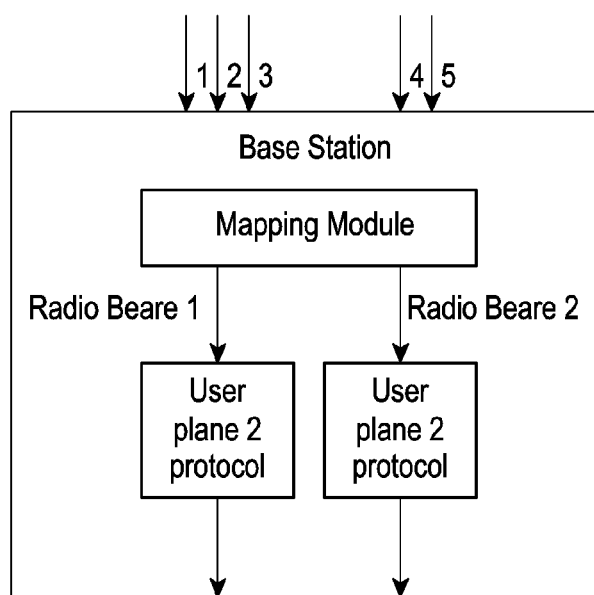
FIG. 8 is a schematic diagram of Embodiment 4 of the present disclosure.

FIG. 8 is a schematic diagram of a base station. In the base station, a mapping function module is added to map a QoS Flow to a DRB or map a DRB to a QoS Flow.

FIGS. 9*a*, 9*b*, 9*c*, and 9*d* show data formats transmitted between the master base station and the secondary base station. For the split bearer, the master base station divides the data, and transmits divided data to the UE through the master base station and the secondary base station, respectively. In order for the master base station to perform reasonable data segmentation, the secondary base station needs to transmit information about rate control. The master base station decides how to divide data by referring to this information. The first table is a data format that the master base station sends to the secondary base station, and it contains a format type indication, a QoS Flow identity and an Xn interface serial number. The format type indication indicates the type of user data format, for example, "0" representing a data format that the master base station sends to the secondary base station. The Xn interface serial number is a serial number allocated by the master base station to data packets of a QoS flow on the Xn interface. For each data packet, the serial number is incremented by one.

The first table is the data format that the master base station sends to the secondary base station, and it contains the format type indication, cache data information of the first QoS Flow, and the next is cache data information of the second QoS Flow, and so on, until cache data information of the $n^{th}$ QoS Flow. When establishing the split bearer, the master base station tells the secondary base station which QoS Flows are created on the secondary base station through a QoS Flow identity list contained in the secondary base station establishment request message. The second format contains cache information corresponding to these QoS Flows, and the order of cache information is the same with that in the QoS Flow identity list.

If the master base station establishes or deletes some QoS Flows established on the secondary base station, corresponding QoS flow places in the table are also adjusted accordingly. For example, if a QoS flow in the first place is deleted from the secondary base station, then the second QoS flow in the original table moves up and becomes the QoS flow in the first place.

The third table is a data format sent by the secondary base station to the master base station, including a format type indication, a QoS Flow identity, data cache information and Xn data loss information. Data cache information is information about the size of a cache of the QoS Flow expected by the secondary base station, and the master base station may adjust a proportion of data segmentation according to this information. Xn data loss information indicates which data is lost during Xn transmission, and the secondary base station may know which data is lost during Xn transmission according to the serial number of the Xn interface in the first table.

The fourth table is a data format sent by the secondary base station to the master base station, including a format type indication, data cache information of the first QoS Flow, and the next one is data cache information of the second QoS flow, and so on, until data cache information of the $n^{th}$ QoS flow. When establishing a split bearer, the master base station tells the secondary base station which QoS Flows are established on the secondary base station through a QoS Flow identity list contained in the secondary base station establishment request message. In the fourth format, cache information corresponding to these QoS flows is included. The orders of cache information are the same with those in the QoS Flow identity list. Data cache information is the size of a cache expected for the QoS Flow, and the master base station can adjust a proportion of data segmentation according to this information. Xn data loss information indicates which data is lost during Xn transmission, and the secondary base station may know which data is lost during Xn transmission based on Xn interface serial numbers in the first table. If the master base station establishes or deletes some QoS flows established on the secondary base station, the locations of corresponding QoS flows in the table are also adjusted accordingly. For example, if the QoS flow of the first place is deleted from the secondary base station, the second QoS flow in the original table moves up and becomes the QoS flow in the first place.

In order to reduce the number of paging areas and reduce signaling for service setup, at present there is a newly proposed UE connection mode referred to as light connection. Light connection refers to when a UE connection is released by a RAN or a UE is inactive, the RAN does not request the core network to release the connection of the UE, e.g., a UE connection between a base station and an MME (e.g., on an S1 interface control plane), a UE connection between a base station and a Serving Gateway (SGW) (e.g., on an S1 interface user plane), a UE connection between a base station and an Access and Mobility Management Function (AMF) (e.g., on a NG-C interface control plane), a UE connection between a base station and a User Plane Function (UPF) (e.g., on a NG-U interface user plane), or the like. When the UE is in an idle state, a light connection state or inactive state, the RAN may still maintain context of the UE, and the core network (e.g., MME, SGW, etc.) may still regard the UE is still in a connected state. When there is downlink data, the core network (e.g., the SGW) may send data for the UE to the base station. If the UE has already been in the idle state or inactive state (e.g., the connection between the UE and the base station has been disconnected, suspended or inactive), the base station may initiating paging of the UE. The light connection may be applied to both architectures of SAE and 5G, as shown in FIG. 1 and FIG. 2.

After the proposed UE connection mode of light connection is adopted, the connection of a UE between the RAN and the core network may be retained if a UE whose connection with a network is disconnected or inactive or enters a light connection state. The UE determined the UE itself is in an idle state (e.g., ECM idle). The core network may decide a UE which is in a light connection state or inactive state to be in a connected state (e.g., ECM Connected). The difference in recognitions of the state of the UE at the UE and the core network may result in a series of problems. The problems may include the following.

Problem 1: When the UE moves out of a paging area, the UE demands to initiate a connection establish request or a connection resume request. If the UE does not have the demand of data transmission at the moment (e.g., having no demand of both uplink data transmission and downlink data transmission), a RAN node may have a plurality of choices. For example, the RAN node may release or suspend the connection and the context of the UE in response to a determination that the UE is moving too fast. For another example, the RAN node may configure the UE to continue in the light connection state. But there is still no specification regarding how to implement the procedure.

Problem 2: When a UE moves out of a paging area and attempts to access a RAN node (referred to as a new RAN node) other than the RAN node which retains the connection and context of the UE (referred to as the old RAN node). If there is no demand of data transmission, the old RAN node may only update the paging area of the UE without switching the UE context and the UE connection to the new RAN node.

Problem 3: When a UE moves out of a paging area, the UE may attempt to resume the connection with the network. When the UE attempts to access a RAN node (referred to as a new RAN node) with which the RAN node that retains the connection and context of the UE (referred to as the old RAN node) does not have an interface in between, the context and connection of the UE cannot be switched from the old RAN node to the new RAN node. Hence, the context and connection of the UE maintained at the old RAN node may be released. Otherwise, downlink data destined for the UE may be directly forwarded to the old RAN node whose paging request for the UE may not be responded by the UE. In such case, the downlink data of the UE may be discarded. After the connection of the UE between the old RAN node and the core network is released, downlink data destined for the UE may be stored in the core network when the downlink data arrives.

Problem 4: A UE may send a periodic location update request to the new RAN node. Extra signaling overhead may be resulted from switching a light connection UE from an old RAN node to a new RAN node each time the UE initiates a periodic location update request to the new RAN node. Especially when a UE frequently moves between RAN nodes while having no demand of data transmission, too much signaling overhead may be generated.

Embodiments of the present disclosure are described hereinafter in detail. Some examples are illustrated in the drawings. The same or similar reference sign represents the same or similar component or components with the same or similar functions. The following embodiments described with reference to the accompanying drawings are merely exemplary, and are only for explaining the present disclosure, not for limiting the protection scope of the present disclosure.

Those skilled in the art may understand that all of terms used herein (including technical terms and scientific terms), unless defined otherwise, have the same meaning with those understood by ordinary technical persons of the art. It should be understood that meanings of terms as defined in general dictionary should be regarded as consistent with context of the conventional art, unless defined specially as herein, and should not be explained in a manner overly ideal or formal.

The principle of the present disclosure and related terms are first explained first for facilitating understanding of the technical mechanism of the present disclosure.

Some terms are explained as below.

In some embodiment, a RAN node may be a base station, an eNB, a NodeB, a RAN central control unit, a RAN node distributed unit, or the like. In the next generation networks, the concept of node may be virtualized as a function or a unit. A RAN central control unit may be connected with a plurality of RAN node distributed units.

In some embodiments, a core network node may be a MME, a SGSN, a SGW, a core network control node, a core network user plane node, a core network control plane node, a core network user plane function, a core network control plane unit, a core network user plane unit, or the like. In the next generation networks, the concept of node may be virtualized as a function or a unit.

In some embodiments, a core network control node may be a MME, a SGSN, a CCNF, an AMF, a SMF, a core network control plane function (e.g., a MME, a CCNF, an AMF), a core network control plane unit, or the like.

In some embodiments, the core network user plane node may be a SGW, a SGSN, a SMF, a UPF core network user plane function, a core network user plane unit, a network slice, or the like.

In some embodiments, a light connection may also be embodied by a RAN initiated paging function, an inactive connection or an inactive state (e.g., an inactive state in 5G, an operation under an inactive state), or the like.

In some embodiment, whether a UE is allowed to enter a light connection may be embodied by whether a UE is suitable for light connection, whether a UE supports light connection, or the like.

In some embodiments, a UE connection state may be embodied by a UE connection mode, and a light connection state may be embodied by a light connection mode.

In some embodiments, the light connection represents the inactive mode, or the connection between the UE and the RAN is inactive or disconnected while the RAN retains the connection of the UE between a RAN node and a core network node.

A RAN node in a light connection with a UE refers to the RAN node that retains the connection of the UE between the RAN node and a core network node when the UE is in a light connection.

The data mentioned herein may include control plane data (e.g., NAS signaling, TAU Request, Service Request, user plane data transported in control plane data packets, etc.) or user plane data. Indication of whether there is data transmitted may further include indication of whether there is demand of uplink control plane data transmission and indication of whether there is demand of uplink user plane data transmission. Indication of whether there is data transmitted may further include indication of whether there is demand of uplink data transmission and indication of whether there is demand of downlink user plane data transmission.

The paging area in the present disclosure may a light connection paging area configured for a UE by a RAN node. When a UE in a light connection moves in a configured paging area, paging from a light-connection RAN node can reach the UE. The paging from the light connection RAN node may be forwarded by other RAN nodes.

The location updated in the present disclosure may be a RAN location update or a core network location update.

The location update control operation of the present disclosure refers to a mobility control operation associated with a light-connection UE, and has the same meaning throughout the disclosure which will not be repeated in the following.

Figure 10:
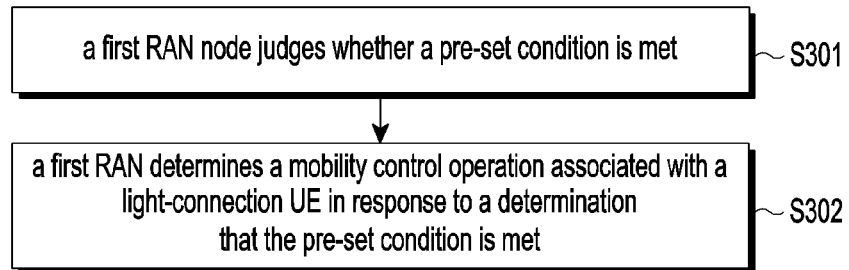
FIG. 10 is a flowchart illustrating a first method of connection control of a light-connection UE in accordance with the present disclosure.

FIG. 10 is a flowchart illustrating a first method of connection control of a light-connection UE in accordance with the present disclosure. As shown in FIG. 10, the method may include the following procedures.

In step S301, a RAN node may judge whether a pre-set condition is met.

Optionally, the pre-set condition may include at least one of: no data transmission demand, only one data transmission demand, no uplink UE data transmission demand, no downlink UE data transmission demand, no control plane data transmission demand, no user plane data transmission demand, UE moves out of a configured paging area, UE changes a paging area, UE does not move out of a configured paging area, obtaining an access request of UE.

Optionally, no data transmission demand may include at least one of: no uplink UE data transmission demand, no downlink UE data transmission demand, no control plane data transmission demand, or no user plane data transmission demand.

Optionally, only one data transmission demand may include at least one of: only one uplink UE data transmission demand, only one downlink UE data transmission demand, only one control plane data transmission demand, or only one user plane data transmission demand. There is only one data transmission demand may be embodied by one of: there is no subsequent data, the only data to be transmitted does not require acknowledgement, the only data to be transmitted has no response (e.g., a response packet of the application layer).

Optionally, obtaining the access request of the UE may include at least one of: receiving a RAN periodic location update request sent by the UE, or receiving a RAN location update request sent by the UE.

In some embodiments, a paging area refers to a mobility area configured for a light-connection UE. When the UE does not move out of the paging area, the UE may perform periodic RAN location update with a RAN node providing the light connection. When the UE has moved out of the paging area, the UE may perform RAN location update with the RAN node providing the light connection. According to some embodiments, a first RAN node may determine whether a UE has moved out of the paging area configured for the UE by obtaining information on the area accessed by the UE. The first RAN node may obtain the information on the area accessed by the UE from one of: the UE, a second RAN node, the core network, a core network user plane node, or a core network control plane node. For example, a UE may initiate a RAN location update after accessing a second RAN node, and the second RAN node may notify the first RAN node of access information of the UE, e.g., a cell identity (cell ID) of the cell accessed by the UE, a location area identity (e.g., a tracking area identity (TAI), a tracking area code (TAC), etc.). As such, the first RAN node may judge whether the UE has moved out of the paging area configured for the UE.

In some embodiments, the first RAN node may judge whether a pre-set condition is met based on the access information of a light-connection UE. Optionally, the access information of the light-connection UE may include at least one of: information on whether there is data transmission demand, information on whether there is data forwarding need, information on whether the UE has moved out of the paging area, information on whether the UE has moved out of the paging area and has no data transmission demand, information on whether there is the need of changing the paging area, or information on whether there is only one data transmission demand. The data mentioned herein may include control plane data (e.g., NAS signaling, TAU Request, Service Request, user plane data transported in control plane data packets, etc.) or user plane data. The data may include uplink data or downlink data; or any combination of uplink data or downlink data. The information on whether there is data transmission or forwarding demand may include at least one of: information on whether there is uplink control plane data transmission or forwarding demand, information on whether there is uplink user plane data transmission or forwarding demand, information on whether there is downlink control plane data transmission or forwarding demand, or information on whether there is downlink user plane data transmission or forwarding demand. According to some embodiments, the first RAN node may obtain the access information about the light-connection UE from at least one of: the UE, a second RAN node, the core network, a core network user plane node, or a core network control plane node. In some embodiments, the access network information of a light-connection UE may be embodied by a reason of setting up a UE connection or resuming a UE connection. For example, in a connection setup request or connection resume request of a UE, the UE may indicate the reason of the connection setup or connection resume is there is no uplink data transmission demand or only that the UE has moved out of the paging area and has no data transmission demand.

Optionally, the first RAN node is a RAN node with which the light connection of the UE is established. In some embodiments, the first RAN node may judge whether the UE has downlink data transmission demand according to whether data of UE is received or whether data of UE is buffered. In some other embodiments, when the UE accesses through a first RAN, the first RAN may judge whether there is uplink data transmission demand according to access information about a light-connection UE received from the UE. When the UE accesses through a second RAN node and the second RAN node is not the RAN node providing the light connection of the UE, the first RAN node may judge whether there is uplink data transmission demand according to access information about the light-connection UE received from the second RAN node.

Optionally, the first RAN node is a new RAN node other than the RAN node providing the light connection of the UE, and the first RAN node is the RAN node providing the light connection of the UE.

1) In some embodiments, the first RAN node obtains information about whether a UE has downlink data transmission demand and whether there is only one downlink transmission demand according to access information about the light-connection UE received from the second RAN node. For example, when the first RAN node requests UE context from the second RAN node, the second RAN node may send information of downlink data forwarding demand or the first downlink data to be transmitted in a UE context response if the second RAN node buffers the downlink data of the UE. For example, the second RAN node may send the only downlink data to be transmitted buffered in the second RAN to the UE via a paging message, or to the first RAN node in a UE context response so that the first RAN node sends the downlink data to the UE.

2) In some other embodiments, the first RAN node obtains information about whether a UE has uplink data transmission demand and whether there is only one uplink transmission demand according to access information about the light-connection UE received from the UE. For example, the access information about the UE may be the reason of connection resume or connection setup, e.g., paging area update indicates it is merely for updating the paging area and there is no uplink data transmission demand.

If uplink data is buffered on the UE, the UE may send information about the uplink data forwarding demand or the first uplink data to be transmitted in a connection setup request or connection resume request sent to the first RAN node. After receiving the information or the first uplink data, the first RAN node may send the information about the uplink data forwarding demand or the first uplink data to be transmitted in a UE context request sent to the second RAN node.

If only the uplink data is buffered on the UE, which needs to be transmitted, the UE may send information about there is only one uplink data forwarding demand and/or the only uplink data to be transmitted in a connection setup request or connection resume request sent to the first RAN node. After receiving the information and/or the only uplink data, the first RAN node may send the information about there is only one uplink data forwarding demand and/or the only uplink data to be transmitted in a UE context request sent to the second RAN node.

In step S302, the first RAN node may determine a mobility control operation associated with the light-connection UE in response to a determination that the pre-set condition is met.

Optionally, when the pre-set condition is met, the mobility control operation associated with the light-connection UE may include at least one of:

releasing the UE, including at least one of: releasing UE context, releasing a connection between the UE and a RAN node, releasing a connection for the UE between the RAN node and a core network node, or requesting the UE to return to an idle mode; e.g., the first RAN node may release the UE when at least one of the following conditions is met: receiving a location update of the UE, there is no data transmission demand, there is only one data transmission demand. It can be understood that, a light connection may occupy some resources and memory in the RAN node; when the memory or resources are insufficient, the RAN node may release some of the light-connection UEs that have no data transmission demand (as in step 201) and/or has only one data transmission demand. Releasing the UE during or after a periodic location update initiated by the UE does not require extra signaling, nor generate extra signaling overhead. The only data to be transmitted may be sent to the UE or the RAN during the periodic location update or during the procedure of releasing the UE.

suspending the UE, including at least one of: suspending UE context, suspending a connection between the UE and a RAN node, suspending a connection for the UE between the RAN node and a core network node, or requesting the UE to return to an idle mode. e.g., the first RAN node may suspend the UE when at least one of the following conditions is met: receiving a location update of the UE, there is no data transmission demand, there is only one data transmission demand. It can be understood that, a light connection may occupy some resources and memory in the RAN node; when the memory or resources are insufficient, the RAN node may suspend some of the light-connection UEs that have no data transmission demand (as in step 201) and/or has only one data transmission demand. Suspending a UE during or after a periodic location update initiated by a UE does not generate extra signaling overhead. The only data to be transmitted may be sent to the UE or the RAN during the periodic location update or during the procedure of suspending the UE. Releasing a UE and suspending a UE both release the resources occupied by the UE. Compared with releasing the UE, the first RAN node may still reserve the context of the UE after suspending the UE.

updating the light-connection paging area of the UE, including at least one of: configuring a light-connection paging area, indicating the light-connection RAN node of the UE is unchanged, or requesting the UE to be in a light-connection mode. For example, the first RAN node may update the light-connection paging area of the UE in response to a determination that at least one of the following conditions is met: the UE has changed the location in the configured paging area (e.g., has changed the cell within the paging area, has changed the RAN area within the paging area, etc.), the UE accesses through the second RAN node.

The RAN node providing the light connection of the UE keeps unchanged. For example, the first RAN node may indicate the RAN node providing the light connection of the UE remains unchanged when at least one of the following conditions is met: the UE does not move out of the configured paging area, a location update of the UE is received, there is no data transmission demand, there is only one data transmission demand, or the UE accesses through the second RAN node. It can be understood that the first RAN node may keep the RAN node providing the light connection of the UE unchanged when the UE accesses through the second RAN node and initiates a RAN location update at the second RAN node and has no data transmission demand or has only one data transmission demand. Further, the first RAN node may indicate the UE that the RAN node providing the light connection of the UE remains unchanged when the UE has not moved out of the configured paging area.

requesting the UE to be in a light connection mode. For example, the first RAN node may request the UE to be in the light connection mode when at least one of the following condition is met: there is no data transmission demand, there is only one data transmission demand, or receiving a location update of the UE. It can be understood that the first RAN node may request the UE to continue in the light connection mode after acknowledging the location update request without data transmission demand. After acknowledging a location update request with only one data transmission demand, the only data to be transmitted may be transmitted during the location update procedure, and the first RAN node may request the UE to continue staying in the light connection mode.

deleting a UE light connection (may be equivalent to releasing the UE or suspending the UE).

Optionally, the first RAN node may send a location update control operation associated with the light-connection UE to at least one of: the UE, the second RAN node. The location update control operation is a mobility control operation associated with the light-connection UE.

It can be understood that the first RAN node may send a location update control operation to the UE when the light-connection UE accesses the first RAN node and initiates a location update. The second RAN node may notify the first RAN node that the UE has initiated a location update request when the light-connection UE accesses the second RAN node and initiates a location update request. The first RAN node may decide a location update operation associated with the UE, and send the operation to the UE through the second RAN node or making the second RAN node perform the location update operation associated with the UE.

Optionally, the first RAN node is a RAN node with which the light connection of the UE is established.

in response to a decision that the UE is to be released or suspended, the first RAN node may release or suspend a connection for the UE between the first RAN node and a core network node; when the UE accesses through a second RAN node, the first RAN node may request the second RAN node to release or suspend the UE. In an embodiment, the first RAN node may reject the UE context request sent by the second RAN node to achieve the releasing or suspending of the UE. The rejection reason may be at least one of: no UE context, unidentified UE ID (e.g., resume ID), released UE, suspended UE.

In response to a decision to update a UE light-connection paging area, when the UE accesses through a second RAN node, the first RAN node may send an updated UE light-connection paging area to the second RAN node.

Optionally, the first RAN node may notify the second RAN node of at least one of: the RAN node providing the light-connection of the UE remains unchanged, requesting the UE to stay in the light connection mode.

Optionally, the first RAN node is a RAN node from which the UE accesses the RAN, and the second RAN node is a RAN node providing the light connection of the UE. In response to a decision to release or suspend the UE, the first RAN node may request the second RAN node to perform at least one of: releasing or suspending context of the UE, releasing or suspending a connection for the UE between the second RAN node and a core network node.

Figure 11:
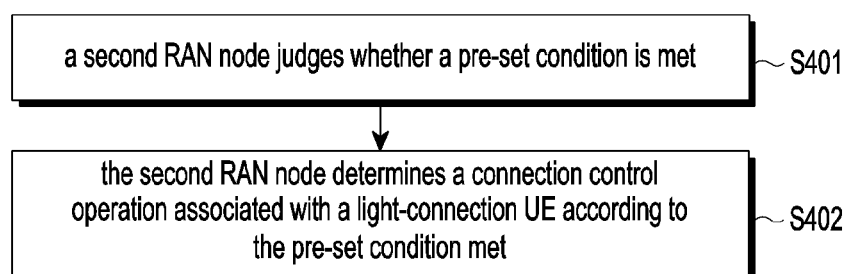
FIG. 11 is a flowchart illustrating a second method of connection control of a light-connection UE in accordance with the present disclosure.

FIG. 11 is a flowchart illustrating a second method of connection control of a light-connection UE in accordance with the present disclosure. As shown in FIG. 11, the method may include the following procedures.

In step S401, a second RAN node may judge whether a pre-set condition is met.

Optionally, the pre-set condition may be at least one of: receiving a mobility control operation associated with a light-connection UE (as in step S302), there is no interface (e.g., an X2 interface between eNBs, an Xn interface between gNBs, etc.) between the second RAN node and a RAN interface providing the light connection of the UE.

In some embodiments, the second RAN node may receive the mobility control operation associated with the light-connection UE from at least one of: the first RAN node, the core network, or the UE.

In step S402, the second RAN node may determine a connection control operation associated with the light-connection UE based on the pre-set condition which is met.

Optionally, when the pre-set condition is receiving a mobility control operation associated with the light-connection UE, the connection control operation associated with the light-connection UE by the second RAN node may include at least one of:

1) The second RAN node sends the received light-connection location update control operation (equivalent to the mobility control operation associated with the light-connection UE). In some embodiment, the second RAN node may send the received light-connection location update control operation (equivalent to the mobility control operation associated with the light-connection UE) to the UE or to the core network.

2) The second RAN node performs an operation according to the received mobility control operation associated with the light-connection UE.

3) In some embodiments, the second RAN node is a RAN node with which the light connection of the UE is established.

When the received mobility control operation associated with the light-connection UE is at least one of: releasing the UE, releasing UE context, releasing a connection between the UE and a RAN node, releasing a connection for the UE between the RAN node and a core network node, or requesting the UE to return to an idle mode; the connection control operation associated with the light-connection UE performed by the second RAN node may include at least one of: releasing context of the UE, releasing a connection for the UE between the RAN node and a core network node.

When the received mobility control operation associated with the light-connection UE is at least one of: suspending the UE, suspending UE context, suspending a connection between the UE and a RAN node, suspending a connection for the UE between the RAN node and a core network node, or requesting the UE to return to an idle mode; the connection control operation associated with the light-connection UE performed by the second RAN node may include at least one of: suspending context of the UE, suspending a connection for the UE between the RAN node and a core network node.

When the received mobility control operation associated with the light-connection UE is at least one of: requesting the UE to stay in the light connection mode; the connection control operation performed associated with the light-connection UE by the second RAN node may include at least one of: instructing the UE to continue staying in the light connection mode.

1) In some embodiments, the second RAN node is a RAN node accessed by the UE.

When the received mobility control operation associated with the light-connection UE is at least one of: releasing the UE releasing UE context, releasing a connection between the UE and a RAN node, releasing a connection for the UE between the RAN node and a core network node, or requesting the UE to return to an idle mode; the connection control operation associated with the light-connection UE performed by the second RAN node may include at least one of: rejecting a connection resume request of the UE, rejecting a connection setup request of the UE, and a rejection reason may be at least one of: no UE context, unidentified UE ID (e.g., resume ID), releasing UE, UE light connected deleted.

When the received mobility control operation associated with the light-connection UE includes at least one of: suspending the UE, suspending UE context, suspending a connection between the UE and a RAN node, suspending a connection for the UE between the RAN node and a core network node, or requesting the UE to return to an idle mode; the connection control operation associated with the light-connection UE performed by the second RAN node may include at least one of: rejecting a connection resume request of the UE, rejecting a connection setup request of the UE, and a rejection reason may be at least one of: suspending UE, UE light connected deleted.

When the received mobility control operation associated with the UE includes at least one of: updating a light-connection paging area of the UE, a light-connection paging area, indicating the light-connection RAN node of the UE remains unchanged, instructing the UE to stay in the light connection mode; the connection control operation associated with the light-connection UE performed by the second RAN node may include at least one of: sending an updated light-connection paging area to the UE, indicating the light-connection RAN node of the UE remains unchanged, requesting the UE to stay in the light-connection mode; notifying the UE of the identity of the light-connection RAN node, notifying the UE of the UE identity (e.g., resume ID, or the like) allocated by the light-connection RAN node of the UE, not updating the path to a path from the core network to the second RAN node, not initiating a UE context delete procedure to the first RAN node.

When the received mobility control operation associated with the UE includes at least one of: deleting the light connection of the UE; the connection control operation associated with the light-connection UE performed by the second RAN node may include at least one of: releasing the UE, suspending the UE.

Optionally, when the pre-set condition is there is no interface between the second RAN node and the RAN interface providing the light connection of the UE, the connection control operation associated with the light-connection UE decided by the second RAN node includes at least one of:

1) indicating there is no interface between the RAN node accessed by the UE and RAN node providing the light connection of the UE. In some embodiments, the second RAN node rejects the connection setup request or connection resume request of the UE. The rejection reason may include: there is no interface between the RAN node accessed by the UE and RAN node providing the light connection of the UE, or a new reason.

2) requesting to initiate a core-level location update procedure (e.g., TAU). A new reason may be defined for this operation. In some embodiments, the second RAN node rejects the connection setup request or connection resume request of the UE. The rejection reason may be: requesting to initiate a core-level location update procedure or a new reason.

After triggering a core-level location update procedure, the core network may find out that the UE has accessed a new RAN node, and the UE context at the old RAN node and the connection of the UE between the RAN node and the core network may be deleted. If the core network received downlink data, the downlink data may be buffered in the core network and not sent to the old RAN node, thus may not become missing due to the UE out of reach of the paging of the old RAN node.

2) forwarding a message of the UE between RAN nodes (e.g., UE context request, etc.) by the second RAN node through the core network. The second RAN node may at the same time notify the core network node of routing information of a target RAN node. Optionally, the routing information may include at least one of: an identity of a serving RAN node (e.g., an identity of a RAN node or an identity of an area to which the RAN node belongs (e.g., TAI, TAC, etc.)), an identity of the target RAN node (e.g., an identity of the RAN node providing the light connection of the UE, an identity of the RAN node accessed by the UE), an identity of the UE (e.g., a UE identity allocated by the RAN node providing the light connection of the UE, e.g., resume ID, which includes an identity of the RAN node providing the light connection of the UE). The core network node may determine the target RAN node by using the routing information of the target RAN node as an index. The core network node may send the routing information of the target RAN node to the target RAN node when forwarding the routing information.

4) requesting to create UE context at the second RAN node. In some embodiments, the second RAN node may request the core network to create UE context at the second RAN node even if there is no data transmission demand.

5) rejecting a connection setup request or a connection resume request of the UE.

Optionally, the second RAN node may send the connection control operation associated with the light-connection UE to at least one of: the UE, a core network node, the first RAN node.

Figure 12:
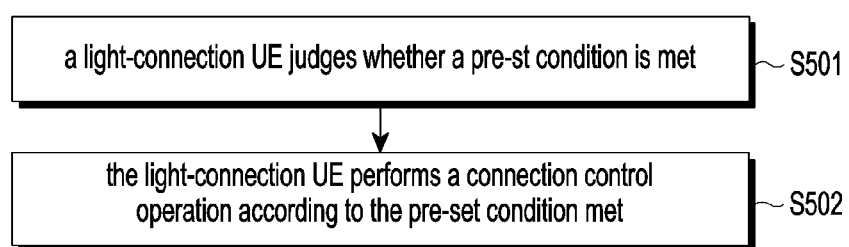
FIG. 12 is a flowchart illustrating a third method of connection control of a light-connection UE in accordance with the present disclosure.

FIG. 12 is a flowchart illustrating a third method of connection control of a light-connection UE in accordance with the present disclosure. As shown in FIG. 12, the method may include the following procedures.

In step S501, a light-connection UE determines whether a pre-set condition is met.

Optionally, the pre-set condition may include at least one of: obtaining a connection control operation associated with the light-connection UE, a mobility control operation associated with the light-connection UE.

Optionally, content of the mobility control operation associated with the light-connection UE is described in the above step S302, and is not repeated here.

Optionally, content of the connection control operation associated with the light-connection UE is described in the above step S402, and is not repeated here.

In some embodiments, the UE may obtain the mobility control operation or the connection control operation associated with the light-connection UE from a UE connection resume rejection reason or a UE connection setup rejection reason.

In some embodiments, the UE obtains the mobility control operation or the connection control operation associated with the light-connection UE from at least one of: a RAN node, a core network.

In step S502, the light-connection UE performs a connection control operation according to the pre-set condition met.

Optionally, the UE may perform the operation according to the received mobility control operation associated with the light-connection UE.

Optionally, the UE may perform the operation according to the received connection control operation associated with the light-connection UE.

Optionally, when the pre-set condition is receiving a mobility control operation associated with the light-connection UE, the UE may perform the connection control operation according to at least one of the following.

When the received light-connection location update control operation associated with the light-connection UE (i.e., the operation performed according to the mobility control operation associated with the light-connection UE) is at least one of: releasing the UE, releasing UE context, releasing a connection between the UE and a RAN node, releasing a connection for the UE between the RAN node and a core network node, or requesting the UE to return to an idle mode; the UE may perform at least one of: releasing context of the UE, releasing a connection between the UE and the RAN node, making the UE return to the idle mode.

When the received light-connection location update control operation associated with the light-connection UE (i.e., the operation performed according to the mobility control operation associated with the light-connection UE) is at least one of: suspending the UE, suspending UE context, suspending a connection between the UE and a RAN node, suspending a connection for the UE between the RAN node and a core network node, or requesting the UE to return to an idle mode; the UE may perform at least one of: suspending context of the UE, suspending a connection between the UE and the RAN node, making the UE return to the idle mode.

When the light-connection location update control operation associated with the UE (i.e., the operation performed according to the mobility control operation associated with the light-connection UE) includes at least one of: updating a light-connection paging area of the UE, a light-connection paging area, indicating the light-connection RAN node providing the light connection of the UE remains unchanged, the identity of the RAN node providing the light-connection of the UE includes the identity of the old RAN node, requesting the UE to stay in the light connection mode; the UE may perform at least one of: updating the light-connection paging area according to the received paging area, making the RAN node providing the light connection of the UE remain unchanged, or making the UE return to the light connection mode. Optionally, the paging area may include one of: a list of area identities (TAI, TAC, etc.), cell identity list, a light-connection location area identity.

When the received light-connection location update control operation associated with the UE (i.e., the operation performed according to the mobility control operation associated with the light-connection UE) includes at least one of: deleting the light connection of the UE; the UE may perform at least one of: deleting UE context, suspending UE context, deleting a connection between the UE and a RAN node, suspending the connection between the UE and the RAN node.

Optionally, when the pre-set condition is receiving a connection control operation associated with the light-connection UE, the UE may perform the connection control operation according to at least one of:

when the connection control operation associated with the light-connection UE includes at least one of: indicating that there is no interface between the RAN node accessed by the UE and the RAN node of the light connection of the UE, requesting to trigger a location update procedure at the core network level, rejecting a connection resume request of the UE; the UE may perform at least one of: initiating a location update procedure at the core network level, initiating a service requesting procedure at the core network level, or initiating a connection setup request at a RAN node.

Figure 13:
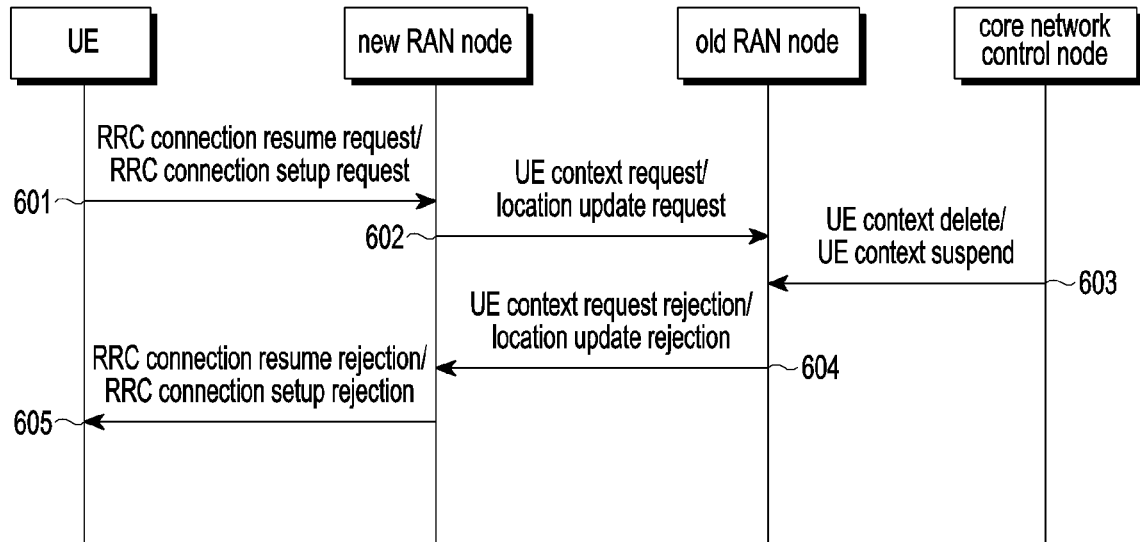
FIG. 13 is a flowchart illustrating a method of connection control of a light-connection UE in accordance with a sixth embodiment of the present disclosure.

FIG. 13 is a flowchart illustrating a method of connection control of a light-connection UE in accordance with a sixth embodiment of the present disclosure. After a UE moves out of a light-connection paging area and accesses through a new RAN node, an old RAN node (the RAN node providing the light connection of the UE) may decide to release the UE or suspending the UE when there is no data transmission request. As shown in FIG. 13, the method may include the following procedures.

In step 601, a UE in a light connection state sends a Radio Resource Control (RRC) connection setup request or an RRC connection resume request to a new RAN node. Optionally, the message may include access information of the light-connection UE. The access information of the light-connection UE is described in step S301, and is not repeated here.

In step 602, the new RAN node may send a UE context request to the old RAN node. Optionally, the message may include access information of the light-connection UE. The access information of the light-connection UE is described in step S301, and is not repeated here.

In step 603, the old RAN node may determine that the pre-set condition met is merely that the UE has moved out of the paging area and has no data transmission demand according to whether data of the UE is buffered in the old RAN and according to the received access information of the light-connection UE. According to the pre-set condition met, the mobility control operation associated with the light-connection UE decided by the old RAN node may be releasing the UE or suspending the UE. The mobility control operation associated with the light-connection UE is described in step S302, and is not repeated here.

The old RAN node may initiate a UE context release procedure or a UE context suspend procedure to the core network control node to release or suspend a connection of the UE between the old RAN node and the core network, or to release or suspend the UE context at the old RAN node respectively.

The old RAN node may initiate a UE context release procedure to release a connection of the UE between the old RAN node and the core network or to release the UE context at the old RAN node.

The old RAN node may initiate a UE context suspend procedure to suspend a connection of the UE between the old RAN node and the core network or to suspend the UE context at the old RAN node.

In step 604, the old RAN node may send a UE context request rejection to the new RAN node. Optionally, the message may include the mobility control operation associated with the light-connection UE. The mobility control operation associated with the light-connection UE is described in step S302, and is not repeated here.

In step 605, the new RAN node may send an RRC connection setup rejection or RRC connection resume rejection to the UE. Optionally, the message may include the mobility control operation associated with the light-connection UE. The mobility control operation associated with the light-connection UE is described in step S302, and is not repeated here. The UE may perform connection control according to the received mobility control operation associated with the light-connection UE, as in step S502.

Hence, the procedure of this embodiment is completed. Unrelated steps are omitted.

Figure 14:
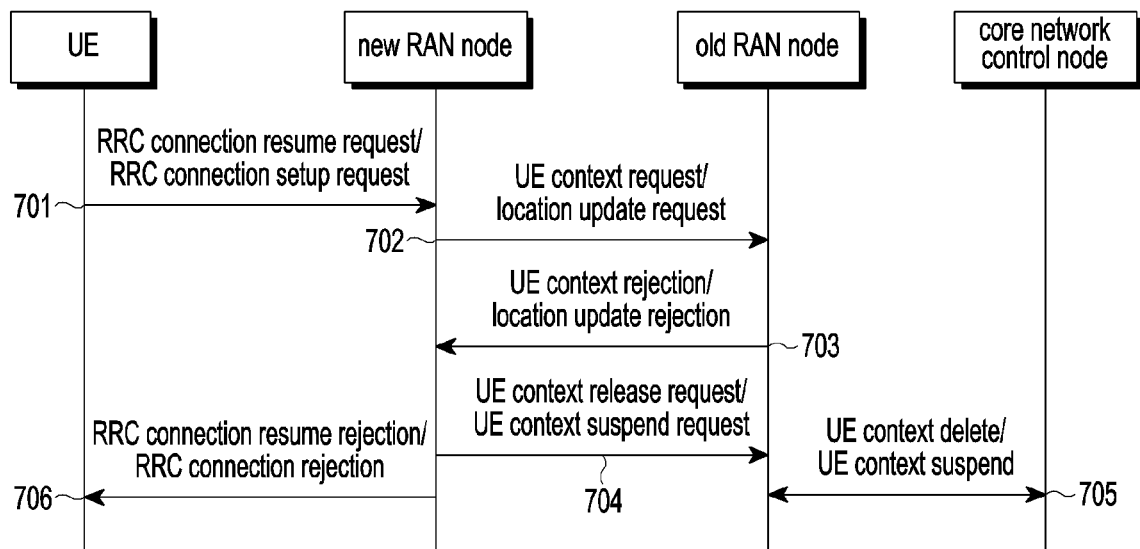
FIG. 14 is a flowchart illustrating a method of connection control of a light-connection UE in accordance with a seventh embodiment of the present disclosure.

FIG. 14 is a flowchart illustrating a method of connection control of a light-connection UE in accordance with a seventh embodiment of the present disclosure. After a UE moves out of a light-connection paging area and accesses through a new RAN node, the new RAN node may decide to release the UE or suspending the UE when there is no data transmission request. As shown in FIG. 14, the method may include the following procedures.

In step 701, a UE in a light connection state sends an RRC connection setup request or an RRC connection resume request to a new RAN node. Optionally, the message may include access information of the light-connection UE. The access information of the light-connection UE is described in step S301, and is not repeated here.

In step 702, the new RAN node may send a UE context request to the old RAN node. Optionally, the message may include access information of the light-connection UE. The access information of the light-connection UE is described in step S301, and is not repeated here.

In step 703, the old RAN node may notify the new RAN node of whether there is downlink data transmission or forwarding demand according to whether data of the UE is buffered in the old RAN node and according to the received access information of the light-connection UE. The old RAN node returns a UE context response. Optionally, the message may include access information of the light-connection UE and indicate whether there is downlink data transmission or forwarding demand.

In step 704, the new RAN node may determine that the pre-set condition met is merely that the UE has moved out of the paging area and has no data transmission demand according to access information of the light-connection UE received from the UE and the old RAN node. According to the pre-set condition met, the mobility control operation associated with the light-connection UE decided by the new RAN node may be releasing the UE or suspending the UE. The mobility control operation associated with the light-connection UE is described in step S302, and is not repeated here.

In response to a decision of releasing the UE, the new RAN node may send a UE context release request to the old RAN node. In response to a decision of suspending the UE, the new RAN node may indicate suspending the UE in the UE context release request sent or send a UE context suspend request.

In step 706, the old RAN node may initiate a UE context release procedure or a UE context suspend procedure to the core network control node to release or suspend a connection of the UE between the old RAN node and the core network, or to release or suspend the UE context at the old RAN node.

In step 707, the new RAN node may send an RRC connection setup rejection or RRC connection resume rejection to the UE. Optionally, the message may include the mobility control operation associated with the light-connection UE. The mobility control operation associated with the light-connection UE is described in step S302, and is not repeated here. The UE may perform connection control according to the received mobility control operation associated with the light-connection UE, as in step S502.

Hence, the procedure of this embodiment is completed. Unrelated steps are omitted.

Figure 15:
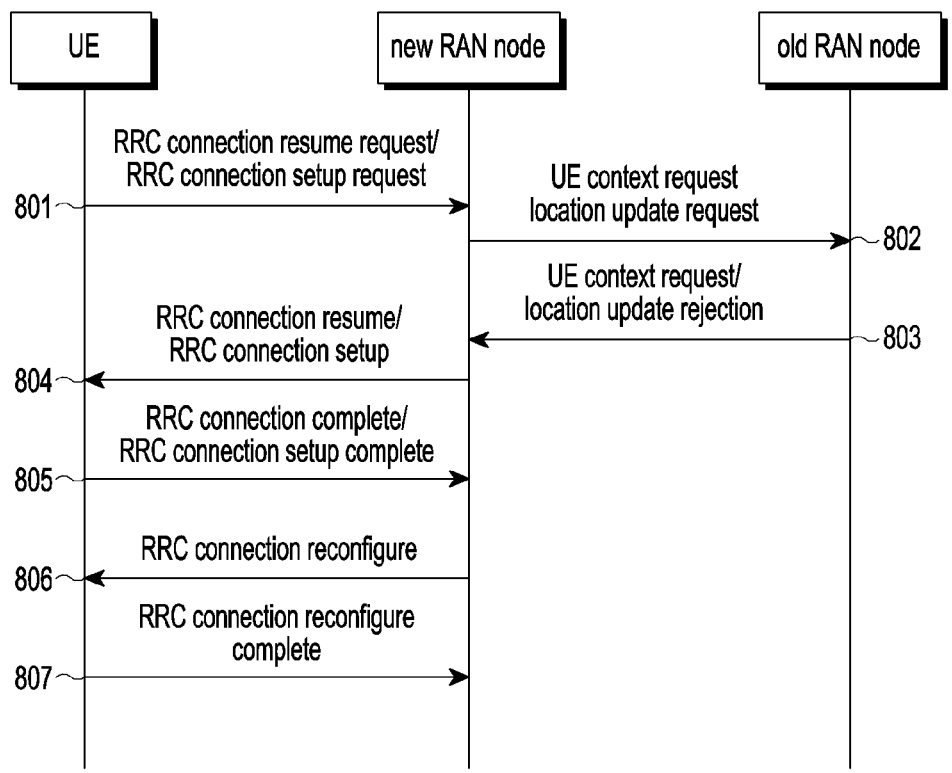
FIG. 15 is a flowchart illustrating a method of connection control of a light-connection UE in accordance with a eighth embodiment of the present disclosure.

FIG. 15 is a flowchart illustrating a method of connection control of a light-connection UE in accordance with an eighth embodiment of the present disclosure. After a UE moves out of a light-connection paging area and accesses a new RAN node, the old RAN node (RAN node providing the light connection of the UE) may decide to update the light-connection paging area of the UE and request the UE to retain the light connection with the old RAN node when there is no data transmission request. As shown in FIG. 15, the method may include the following procedures.

In step 801, a UE in a light connection state sends an RRC connection setup request or an RRC connection resume request to a new RAN node. Optionally, the message may include access information of the light-connection UE. The access information of the light-connection UE is described in step S301, and is not repeated here.

In step 802, the new RAN node may send a UE context request to the old RAN node. Optionally, the message may include access information of the light-connection UE. The access information of the light-connection UE is described in step S301, and is not repeated here.

In step 803, the old RAN node may determine that the pre-set condition met is merely that the UE has moved out of the paging area and has no data transmission demand according to whether data of the UE is buffered in the old RAN and according to the received access information of the light-connection UE. The old RAN node may decide to update the light-connection paging area of the UE according to the pre-set condition met, and the RAN node providing the light connection of the UE remains the old RAN node. The mobility control operation associated with the light-connection UE is described in step S302, and is not repeated here.

In step 804, the old RAN node may send a UE context response to the new RAN node. Optionally, the message may include the mobility control operation associated with the light-connection UE. The mobility control operation associated with the light-connection UE is described in step S302, and is not repeated here.

In step 805, the new RAN node may send an RRC connection setup message or RRC connection resume message to the UE.

In step 806, the UE may send may send an RRC connection setup complete message or RRC connection resume complete message to the new RAN node.

In step 807, the new RAN node sends an RRC connection re-configure message to the UE. Optionally, the message may include the mobility control operation associated with the light-connection UE. The mobility control operation associated with the light-connection UE is described in step S302, and is not repeated here. The UE may perform connection control according to the received mobility control operation associated with the light-connection UE, as in step S502.

In step 807, after the configuration is completed, the UE may send an RRC re-configure complete message to the new RAN node and return to the light connection mode.

Hence, the process of this embodiment is completed. Unrelated steps are omitted.

Figure 16:
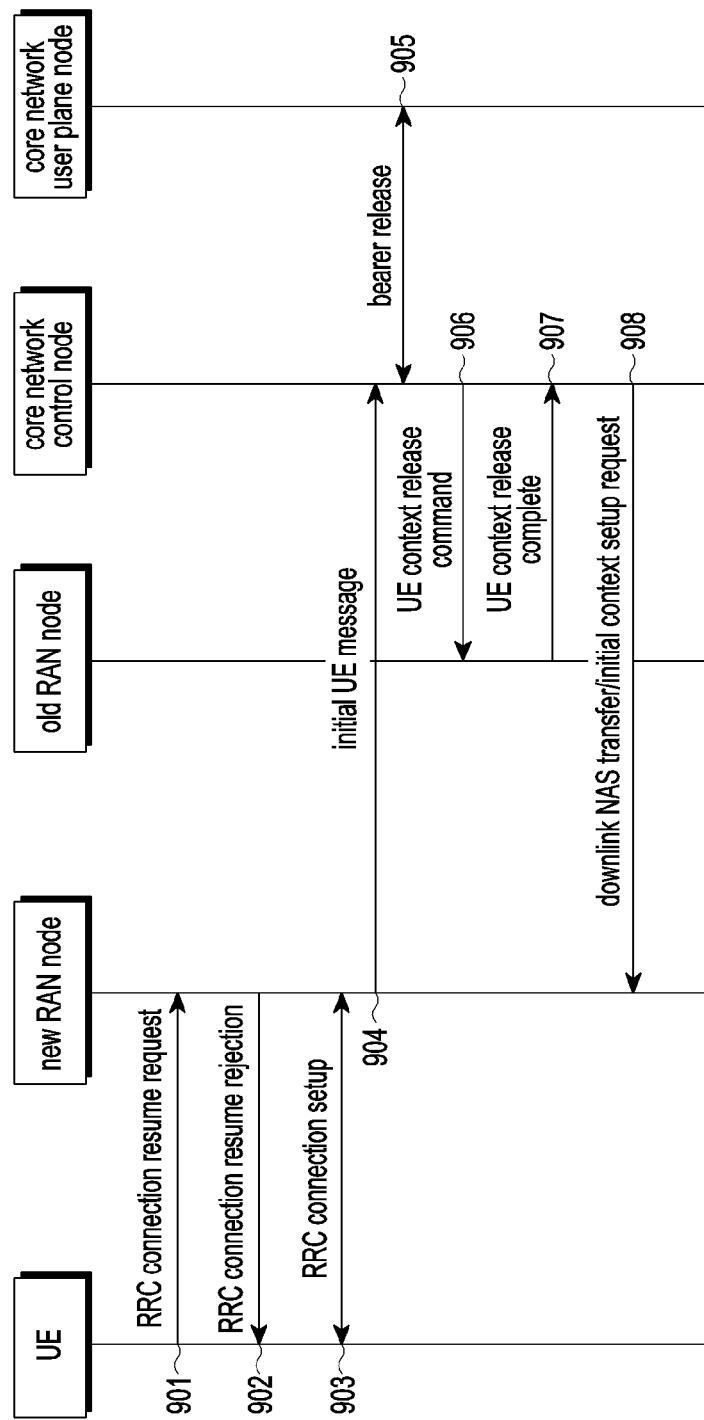
FIG. 16 is a flowchart illustrating a method of connection control of a light-connection UE in accordance with a ninth embodiment of the present disclosure.

FIG. 16 is a flowchart illustrating a method of connection control of a light-connection UE in accordance with a ninth embodiment of the present disclosure. When the UE accesses a new RAN node and there is no interface between the new RAN node and the old RAN node, the UE may initiate a core network level location update procedure. The new RAN node is the second RAN node in the second method. As shown in FIG. 16, the method may include the following procedures.

In step 901, a UE in a light connection state sends an RRC connection setup request or an RRC connection resume request to a new RAN node. Optionally, the message may include access information of the light-connection UE. The access information of the light-connection UE is described in step S301, and is not repeated here.

In step 902, the new RAN node finds out that there is no interface with the new RAN node, and sends to the UE at least one of: an RRC connection setup rejection, an RRC connection setup, an RRC connection resume, an RRC connection resume rejection. Optionally, the message may include UE context request for the light connection of the UE. Optionally, the message may include a connection control operation associated with the light-connection UE. The connection control operation associated with the light-connection UE is described in step S402, and is not repeated here.

In step 903, the UE may initiate a core network level location update procedure (e.g., a TAU request), and the procedure is described in step S502. The UE establishes an RRC connection with the new RAN node.

In step 904, the new RAN node sends an initiate UE message to a core network control node. Optionally, the message may include an indication requesting the core network to create UE context at the new RAN node.

In step 905, the core network control node finds out the UE accesses the new RAN node. The core network node may immediately release an interface of the UE between the old RAN node and a core network user plane node. As such, data will not continue to be sent to the old RAN node.

In step 906, the core network control node sends a UE context release command to the old RAN node. Optionally, the message may include each UE bearer (e.g., E-RAB, DRB, etc.), UE session (e.g., PDU session PDU connectivity, etc.), UE QoS stream and/or data forwarding address of UE service data stream, instructing the old RAN node to forward data to the core network user plane node.

In step 907, the old RAN node sends a UE context release complete to the core network control node.

In step 908, the core network node may decide whether to establish a UE bearer, a UE session, a UE QoS stream and/or context of a UE service data stream at the new RAN node according to the needs. If the new RAN node requests to set up UE context, an initial context setup request may be sent. When only the TAU has no data transmission demand and the new RAN node doesn't requests to setup the UE context, a downlink NAS transmission message may be sent.

Hence, the procedure of this embodiment is completed. Unrelated steps are omitted.

Figure 17:
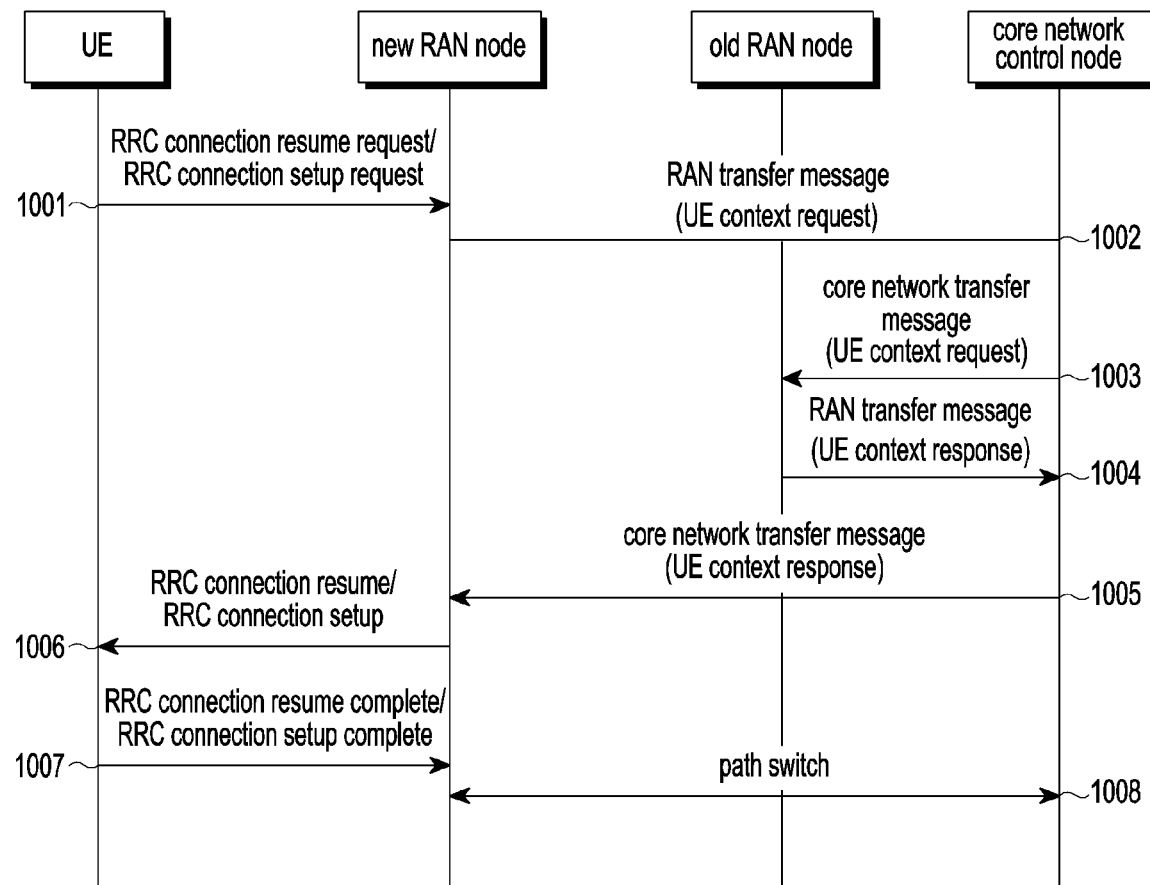
FIG. 17 is a flowchart illustrating a method of connection control of a light-connection UE in accordance with a tenth embodiment of the present disclosure.

FIG. 17 is a flowchart illustrating a method of connection control of a light-connection UE in accordance with a fifth embodiment of the present disclosure. When a UE accesses a new RAN node which has no interface with the old RAN node, the new RAN node may send a message for the UE to the old RAN node through the core network. The old RAN node may send a message for the UE to the new RAN node through the core network. As shown in FIG. 17, the method may include the following procedures.

In step 1001, a UE in a light connection state sends an RRC connection setup request or an RRC connection resume request to a new RAN node. Optionally, the message may include access information of the light-connection UE. The access information of the light-connection UE is described in step S301, and is not repeated here.

In step 1002, the new RAN node finds out there is no interface with the old RAN node, and sends a RAN transfer message to a core network control node. Optionally, the message may include an inter-RAN node message for the UE (e.g., a UE context request), and the UE ID (e.g., a resume ID) allocated by the old RAN node.

In step 1003, the core network control node may identify the old RAN node by using the RAN node identity in the resume ID as an index, and forward the inter-RAN node message (e.g., a UE context request) in a core network transfer message.

In step 1004, the old RAN node sends a RAN transfer message to the core network control node. Optionally, the message may include an inter-RAN node message for the UE (e.g., a UE context request), and an identity of the new RAN node.

In step 1005, the core network control node may identify the new RAN node by using the identity of the new RAN node as an index, and forward the inter-RAN node message (e.g., a UE context response) in a core network transfer message.

In step 1006, the new RAN node initiates a path switch request procedure to a core network node.

In step 1007, the new RAN node may return an RRC connection setup message or RRC connection resume message to the UE.

In step 1008, the new RAN node initiates a path switch procedure to the core network control node.

Hence, the procedure of this embodiment is completed. Unrelated steps are omitted.

Figure 18:
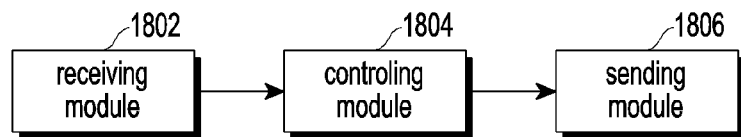
FIG. 18 is a schematic diagram illustrating modules of a network device in accordance with an embodiment of the present disclosure.

FIG. 18 is a schematic diagram illustrating a preferred structure of a network device in accordance with the present disclosure. As shown in FIG. 18, the RAN device may include: a receiving module 1802, a sending module 1806 and a controlling module 1804.

The controlling module 1804 may judge whether a pre-set condition is met, and determine a mobility control operation associated with a light-connection UE in response to a determination that the pre-set condition is met.

The sending module 1806 may send the mobility control operation associated with the light-connection UE under the control of the controlling module 1804.

Figure 19:
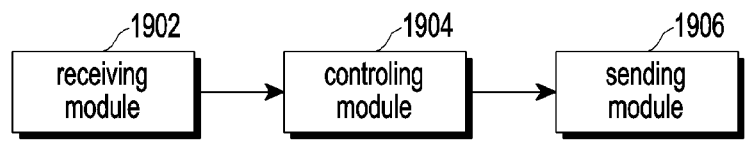
FIG. 19 is a schematic diagram illustrating modules of a network device in accordance with an embodiment of the present disclosure.

FIG. 19 is a schematic diagram illustrating a preferred structure of a network device in accordance with the present disclosure. As shown in FIG. 19, the core network device may include: a receiving module 1902, a sending module 1906 and a controlling module 1904.

The controlling module 1904 may judge whether a pre-set condition is met, and determine a connection control operation associated with a light-connection UE in response to a determination that the pre-set condition is met.

The sending module 1906 may send the connection control operation associated with the light-connection UE under the control of the controlling module 1904.

Figure 20:
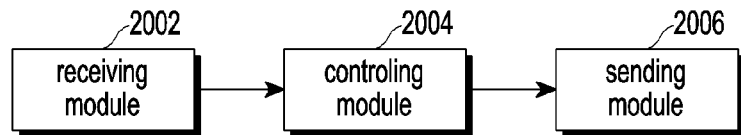
FIG. 20 is a schematic diagram illustrating modules of a user equipment in accordance with an embodiment of the present disclosure.

FIG. 20 is a schematic diagram illustrating a preferred structure of a user device in accordance with the present disclosure. As shown in FIG. 20, the user device may include: a receiving module 2002, a sending module 2006 and a controlling module 2004.

The receiving module 2002 may receive from a network device an indication of reception of a connection control operation and/or a mobility control operation associated with a light-connection UE.

The controlling module 2004 may perform the connection control operation and/or the mobility control operation according to the information.

Various example embodiments of the present disclosure may be implemented as computer readable codes in a computer readable recording medium. The computer readable recording medium is a data storage device that may store data readable by a computer system. Examples of the computer readable recording medium may include read only memories (ROMs), random access memories (RAMs), compact disk-read only memories (CD-ROMs), magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner. Functional programs, codes, and code segments to attain various embodiments of the present disclosure may be readily interpreted by skilled programmers in the art to which the present disclosure pertains.

The apparatuses and methods according to example embodiments of the present disclosure may be implemented in hardware, software, or a combination of hardware and software. Such software may be recorded in volatile or non-volatile storage devices, such as ROMs, memories, such as RAMs, memory chips, memory devices, or integrated circuit devices, compact disks (CDs), DVDs, magnetic disks, magnetic tapes, or other optical or magnetic storage devices while retained in machine (e.g., computer)-readable storage media. The methods according to example embodiments of the present disclosure may be implemented by a computer or a portable terminal including a controller and a memory, and the memory may be an example machine-readable storage medium that may properly retain program(s) containing instructions for implementing the embodiments of the present disclosure.

Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

The apparatuses according to various example embodiments of the present disclosure may receive the program from a program providing device via wire or wirelessly and store the same. The program providing apparatus may include a memory for storing a program including instructions enabling a program processing apparatus to perform a method according to an embodiment of the present disclosure and data necessary for a method according to an example embodiment of the present disclosure, a communication unit for performing wired or wireless communication with a graphic processing apparatus, and a controller transmitting the program to the graphic processing apparatus automatically or as requested by the graphic processing apparatus.

The above is a description of a few examples and technical principles. It should clear for those skilled in the art that the protection scope is not limited to the above specified combinations of technical features, and technical mechanisms comprising any modifications and equivalents of the technical features within the principle of various examples should be covered in the protection scope of the invention. For example, a technical mechanism may be obtained by replacing the above features with other features with similar functions.

What is described in the foregoing are only embodiments of the present disclosure, and should not be construed as limitations to the present disclosure. Any changes, equivalent replacements, modifications made without departing from the scope of the present disclosure are intended to be included within the protecting scope of the present disclosure.

What is claimed is:

1. A method performed by a master base station in a wireless communication system, the method comprising:
    transmitting, to a secondary base station, a secondary base station addition request message including an identity of a protocol data unit (PDU) session, an identity of quality of service (QoS) flow associated with the PDU session, and quality requirement information associated with the QoS flow;
    receiving, from the secondary base station, a secondary base station addition response message including an identity of a data radio bearer (DRB), transport layer information for an user plane on an Xn interface, a radio resource control (RRC) container, and the identity of the PDU session, wherein the RRC container includes configuration information of a secondary cell associated with the secondary base station; and
    transmitting, to a user equipment (UE), an RRC reconfiguration message including the RRC container.

2. The method of claim 1, wherein the secondary base station addition request message further comprises the identity of the DRB and a QoS requirement associated with the DRB.

3. The method of claim 2,
    wherein the quality requirement information associated with the QoS flow comprises at least one of QoS flow description information, data delay information, a data error rate, a priority, a guaranteed data rate, or a maximum data rate, and
    wherein the QoS requirement associated with the DRB comprises at least one of QoS flow description information, data delay information, a data error rate, a priority, a guaranteed data rate, or a maximum data rate.

4. The method of claim 1, wherein the secondary base station addition response message further comprises an identity of the Xn interface.

5. A method performed by a secondary base station in a wireless communication system, the method comprising:
receiving, from a master base station, a secondary base station addition request message including an identity of a protocol data unit (PDU) session, an identity of quality of service (QoS) flow associated with the PDU session, and quality requirement information associated with the QoS flow; and
transmitting, to the master base station, a secondary base station addition response message including an identity of a data radio bearer (DRB), transport layer information for an user plane on an Xn interface, a radio resource control (RRC) container, and a the identity of the PDU session, wherein the RRC container includes configuration information of a secondary cell associated with the secondary base station.

6. The method of claim 5, wherein the secondary base station addition request message further comprises the identity of the DRB and a QoS requirement associated with the DRB.

7. The method of claim 6,
wherein the quality requirement information associated with the QoS flow comprises at least one of QoS flow description information, data delay information, a data error rate, a priority, a guaranteed data rate, or a maximum data rate, and
wherein the QoS requirement associated with the DRB comprises at least one of QoS flow description information, data delay information, a data error rate, a priority, a guaranteed data rate, or a maximum data rate.

8. The method of claim 5, wherein the secondary base station addition response message further comprises an identity of the Xn interface.

9. A master base station in a wireless communication system, the master base station comprising:
a transceiver; and
at least one processor coupled with the transceiver and configured to control to:
transmit, to a secondary base station, a secondary base station addition request message including an identity of a protocol data unit (PDU) session, an identity of quality of service (QoS) flow associated with the PDU session, and quality requirement information associated with the QoS flow, and
receive, from the secondary base station, a secondary base station addition response message including an identity of a data radio bearer (DRB), transport layer information for an user plane on an Xn interface, a radio resource control (RRC) container, and the identity of the PDU session, wherein the RRC container includes configuration information of a secondary cell associated with the secondary base station, and
transmit, to a user equipment (UE), an RRC reconfiguration message including the RRC container.

10. The master base station of claim 9, wherein the secondary base station addition request message further comprises the identity of the DRB and a QoS requirement associated with the DRB identifier.

11. The master base station of claim 10, wherein the quality requirement information associated with the QoS flow comprises at least one of QoS flow description information, data delay information, a data error rate, a priority, a guaranteed data rate, or a maximum data rate, and
wherein the QoS requirement associated with the DRB comprises at least one of QoS flow description information, data delay information, a data error rate, a priority, a guaranteed data rate, or a maximum data rate.

12. The master base station of claim 9, wherein the secondary base station addition response message further comprises an identity of the Xn interface.

13. A secondary base station in a wireless communication system,
the secondary base station comprising:
a transceiver; and
at least one processor coupled with the transceiver and configured to control to:
receive, from a master base station, a secondary base station addition request message including an identity of a protocol data unit (PDU) session, an identity of quality of service (QoS) flow associated with the PDU session, and quality requirement information associated with the QoS flow, and
transmit, to the master base station, a secondary base station addition response message including an identity of a data radio bearer (DRB), transport layer information for an user plane on an Xn interface, a radio resource control (RRC) container, and the identity of the PDU session, wherein the RRC container includes configuration information of a secondary cell associated with the secondary base station.

14. The secondary base station of claim 13, wherein the secondary base station addition request message further comprises the identity of the DRB and a QoS requirement associated with the DRB.

15. The secondary base station of claim 14,
wherein the quality requirement information associated with the QoS flow comprises at least one of QoS flow description information, data delay information, a data error rate, a priority, a guaranteed data rate, or a maximum data rate, and
wherein the QoS requirement associated with the DRB comprises at least one of QoS flow description information, data delay information, a data error rate, a priority, a guaranteed data rate, or a maximum data rate.

16. The secondary base station of claim 13, wherein the secondary base station addition response message further comprises an identity of the Xn interface.

* * * * *